(12) United States Patent
Monma et al.

(10) Patent No.: US 11,375,073 B2
(45) Date of Patent: Jun. 28, 2022

(54) SHEET SEPARATION DEVICE, LAMINATOR, IMAGE FORMING APPARATUS, AND IMAGE FORMING SYSTEM

(71) Applicants: Shinya Monma, Kanagawa (JP); Tomohiro Furuhashi, Kanagawa (JP); Wataru Takahashi, Tokyo (JP); Sho Asano, Kanagawa (JP); Yoshito Suzuki, Chiba (JP); Joji Akiyama, Kanagawa (JP); Yohsuke Haraguchi, Kanagawa (JP); Wataru Nozaki, Kanagawa (JP)

(72) Inventors: Shinya Monma, Kanagawa (JP); Tomohiro Furuhashi, Kanagawa (JP); Wataru Takahashi, Tokyo (JP); Sho Asano, Kanagawa (JP); Yoshito Suzuki, Chiba (JP); Joji Akiyama, Kanagawa (JP); Yohsuke Haraguchi, Kanagawa (JP); Wataru Nozaki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 17/175,847

(22) Filed: Feb. 15, 2021

(65) Prior Publication Data

US 2021/0289090 A1 Sep. 16, 2021

(30) Foreign Application Priority Data

Mar. 10, 2020 (JP) .............................. JP2020-040770

(51) Int. Cl.
*G06K 15/00* (2006.01)
*H04N 1/00* (2006.01)
*B32B 37/00* (2006.01)

(52) U.S. Cl.
CPC ..... *H04N 1/00628* (2013.01); *B32B 37/0053* (2013.01); *H04N 1/00037* (2013.01);
(Continued)

(58) Field of Classification Search
None
See application file for complete search history.

(56) References Cited

U.S. PATENT DOCUMENTS

| 7,404,553 | B2 * | 7/2008 | Steinhilber | ............. B65H 3/56 271/42 |
| 2011/0073234 | A1 * | 3/2011 | Lee | ....................... B32B 37/142 156/364 |

(Continued)

FOREIGN PATENT DOCUMENTS

| JP | 9-164593 | 6/1997 |
| JP | 2005-074936 | 3/2005 |

(Continued)

*Primary Examiner* — Dung D Tran
(74) *Attorney, Agent, or Firm* — Harness, Dickey & Pierce, P.L.C.

(57) ABSTRACT

A sheet separation device separates a non-bonding portion of a two-ply sheet in which two sheets are overlapped and bonded together at a bonding portion of the two-ply sheet. The sheet separation device includes a separator, an abnormality detection device, and circuitry. The separator is configured to move to be inserted into a gap formed between the two sheets of the two-ply sheet. The abnormality detection device is configured to detect an abnormal state in which the gap larger than a predetermined size is not formed between the two sheets before the separator is inserted into the gap. The circuitry is configured to control movement of the separator based on a result detected by the abnormality detection device.

17 Claims, 16 Drawing Sheets

(52) U.S. Cl.
CPC ..... *H04N 1/00074* (2013.01); *H04N 1/00082* (2013.01); *H04N 1/00538* (2013.01); *H04N 1/00602* (2013.01); *H04N 1/00607* (2013.01); *H04N 1/00615* (2013.01); *H04N 1/00631* (2013.01)

(56) References Cited

U.S. PATENT DOCUMENTS

| | | | |
|---|---|---|---|
| 2016/0209789 A1* | 7/2016 | Nozawa | G03G 15/2028 |
| 2018/0201466 A1 | 7/2018 | Saito et al. | |
| 2018/0236744 A1 | 8/2018 | Suzuki et al. | |
| 2018/0257900 A1 | 9/2018 | Suzuki et al. | |
| 2018/0259895 A1 | 9/2018 | Shibasaki et al. | |
| 2018/0265313 A1 | 9/2018 | Heishi et al. | |
| 2019/0010011 A1 | 1/2019 | Watanabe et al. | |
| 2019/0276263 A1 | 9/2019 | Hidaka et al. | |
| 2019/0284008 A1 | 9/2019 | Sakano et al. | |
| 2019/0284009 A1 | 9/2019 | Suzuki et al. | |
| 2019/0284010 A1 | 9/2019 | Asami et al. | |
| 2019/0284011 A1 | 9/2019 | Furuhashi et al. | |
| 2019/0284012 A1 | 9/2019 | Yoneyama et al. | |
| 2019/0367317 A1 | 12/2019 | Haraguchi et al. | |
| 2020/0140222 A1 | 5/2020 | Takahashi et al. | |
| 2020/0239265 A1 | 7/2020 | Suzuki et al. | |
| 2020/0247107 A1 | 8/2020 | Morinaga et al. | |
| 2020/0247636 A1 | 8/2020 | Furuhashi et al. | |
| 2020/0338877 A1 | 10/2020 | Takahashi et al. | |
| 2020/0341414 A1 | 10/2020 | Watanabe et al. | |

FOREIGN PATENT DOCUMENTS

| | | |
|---|---|---|
| JP | 2006-160429 | 6/2006 |
| JP | 2017-132559 | 8/2017 |

\* cited by examiner

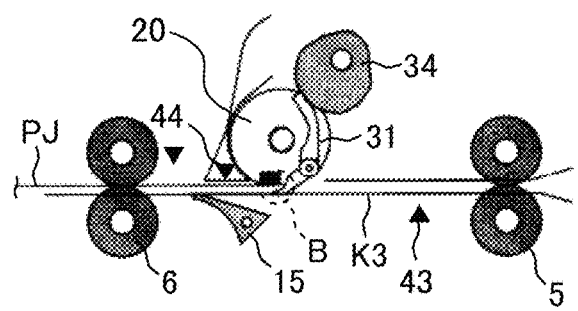
FIG. 5A
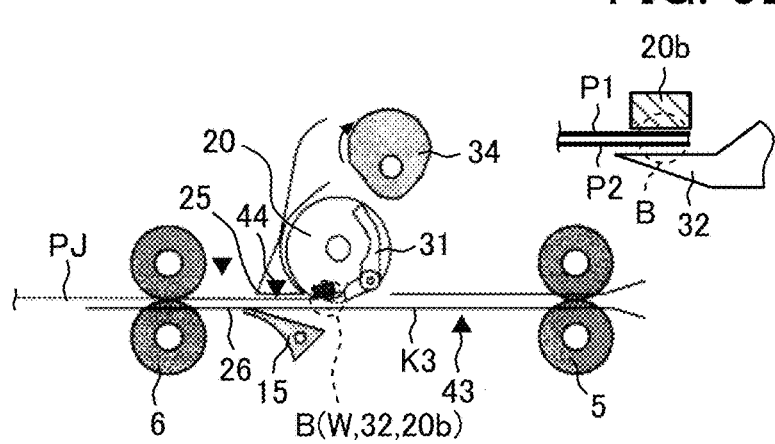
FIG. 5B
FIG. 5B'
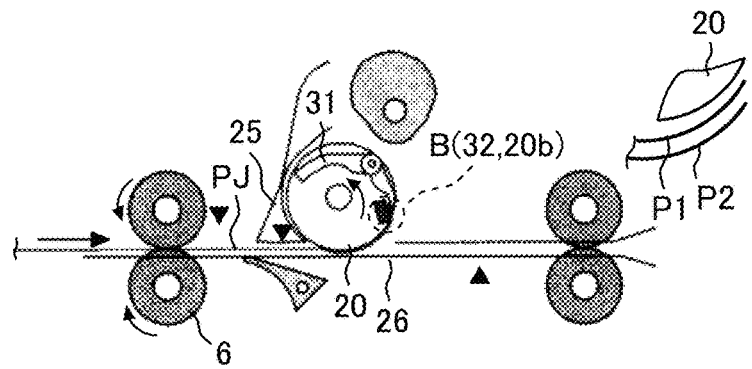
FIG. 5C
FIG. 5C'
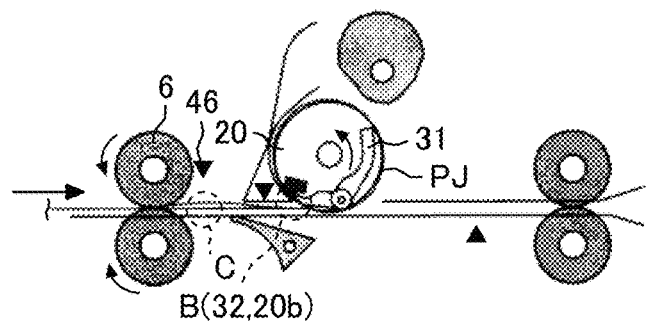
FIG. 5D

SHEET SEPARATION DEVICE, LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2020-040770, filed on Mar. 10, 2020, in the Japan Patent Office, the entire disclosure of which is incorporated by reference herein.

BACKGROUND

Technical Field

This disclosure relates to a sheet separation device configured to separate a two-ply sheet in which two sheets are overlapped and bonded together at a bonding portion of the two-ply sheet, a laminator incorporating the sheet separation device, an image forming apparatus incorporating the sheet separation device, such as a copier, printer, facsimile machine, and a multi-functional apparatus including at least two functions of the copier, printer, and facsimile machine, and an image forming system incorporating the sheet separation device.

Related Art

A sheet separation device (i.e. a laminator) separates a two-ply sheet in which two sheets are overlapped and bonded together at a bonding portion of the two-ply sheet.

SUMMARY

This specification describes an improved sheet separation device that separates a non-bonding portion of a two-ply sheet in which two sheets are overlapped and bonded together at a bonding portion of the two-ply sheet. The sheet separation device includes a separator, an abnormality detection device, and circuitry. The separator is configured to move to be inserted into a gap formed between the two sheets of the two-ply sheet. The abnormality detection device is configured to detect an abnormal state in which the gap larger than a predetermined size is not formed between the two sheets before the separator is inserted into the gap. The circuitry is configured to control movement of the separator based on a result detected by the abnormality detection device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A to 5D are schematic views of the main part of the sheet separation device illustrated in FIG. 1, illustrating operations of the sheet separation device, subsequent from the operations of FIGS. 4A to 4D;

FIG. 11 including

Figure 1:
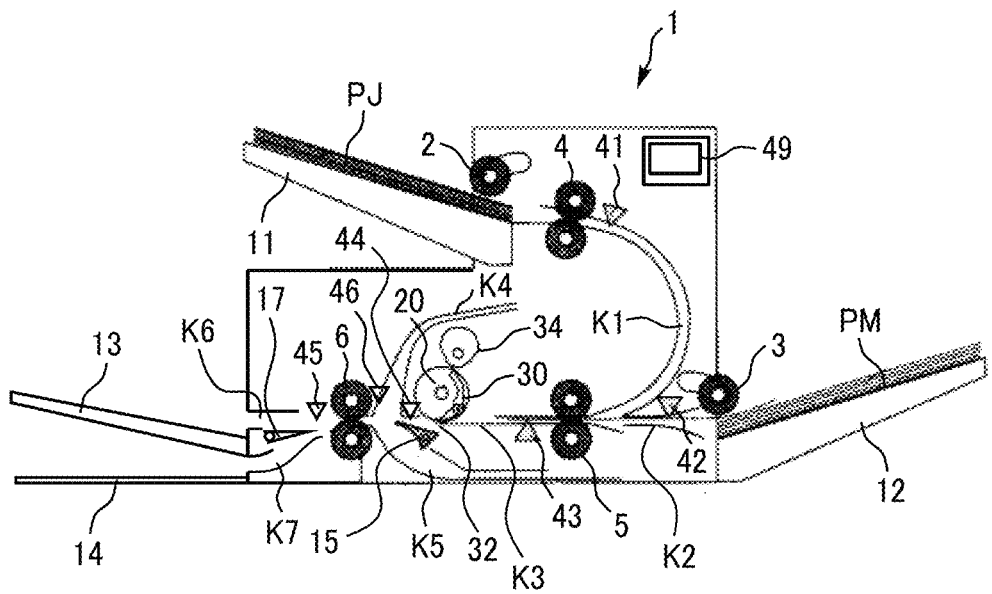
FIG. 1 is a schematic view illustrating an overall configuration of a sheet separation device according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

With reference to the drawings, embodiments of the present disclosure are described below. Identical reference numerals are assigned to identical components or equivalents and a description of those components is simplified or omitted.

A configuration and operations of a sheet separation device 1 are described below with reference to FIG. 1.

Figure 10A:
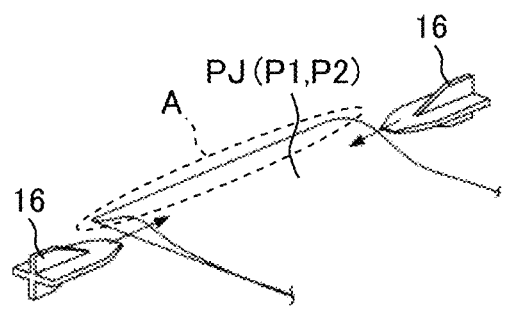
FIGS. 10A to 10C are perspective views illustrating operations of the separation claws in the width direction.
Figure 10B:
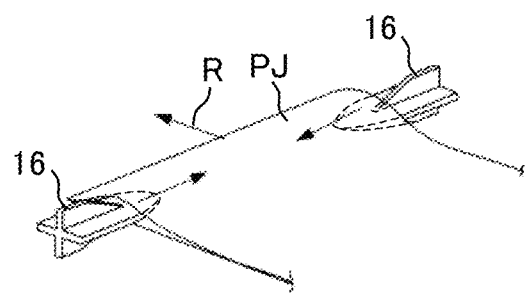
Figure 10C:
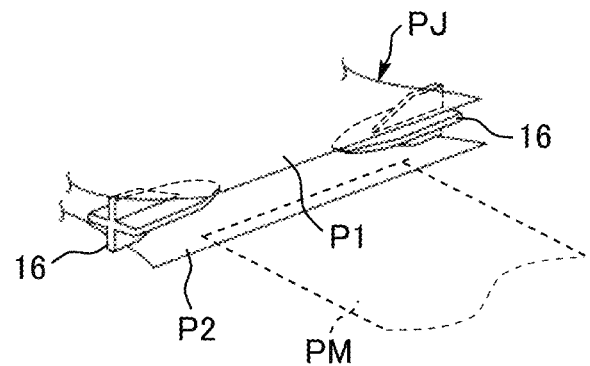

The sheet separation device 1 separates a non-bonding portion of a two-ply sheet PJ in which two sheets P1 and P2 are overlapped and bonded together at a bonding portion A of the two-ply sheet (see FIGS. 10A to 10C).

The two-ply sheet PJ in the present embodiment is made of two sheets P1 and P2 overlapped and bonded together at one side of four sides as the bonding portion A. That is, in the two-ply sheet PJ made of two sheets P1 and P2, only one sides of the two sheets P1 and P2 are connected by thermal welding or the like as the bonding portion A, and the other sides of the two sheets P1 and P2 are not connected. As the two sheets P1 and P2 constituting the two-ply sheet PJ, a transparent film sheet (that is, a laminate sheet) may be used.

The sheet separation device 1 separates the two sheets P1 and P2 constituting the tow-ply sheet PJ (i.e. separates a portion opposite the bonding portion A that maintains bonding the two sheets P1 and P2). Subsequently, the sheet separation device 1 inserts an insertion sheet PM between the separated two sheets P1 and P2. The insertion sheet PM is a sheet such as one plain sheet.

Figure 4A:
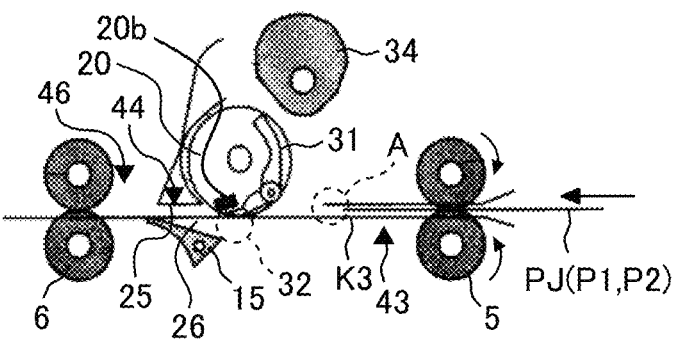
FIGS. 4A to 4D are schematic views of a main part of the sheet separation device illustrated in FIG. 1, illustrating operations of the sheet separation device.

As illustrated in FIG. 1, the sheet separation device 1 includes a first feed tray 11, a second feed tray 12, a first feed roller 2, a second feed roller 3, a first conveyance roller pair 4, a second conveyance roller pair 5, a third conveyance roller pair 6, an ejection tray 13, a purge tray 14, a first sensor 41, a second sensor 42, a third sensor 43, a fourth sensor 44, a fifth sensor 45, an abnormality detection sensor 46, a winding roller 20, a moving mechanism 30, a switching claw 15, separation claws 16 (see FIGS. 6A to 6C and FIGS. 10A and 10B), a bifurcating claw 17, a first guide 25 as an inner limiter (see FIG. 4A), a second guide 26 as an outer limiter (see FIG. 4A).

Additionally, the sheet separation device 1 includes a plurality of conveyance paths such as a first conveyance path K1, a second conveyance path K2, a third conveyance path K3, a first branched conveyance path K4, a second branched conveyance path K5, and a fourth conveyance path K6. The above-described conveyance paths K1 to K5 each include two conveyance guide plates facing each other to guide and convey the sheet such as the two-ply sheet PJ or the insertion sheet PM.

In addition to the conveyance paths K1 to K6 described above, the sheet separation device 1 includes a retreat conveyance path K7 to guide and convey the two-ply sheet PJ that is not sufficiently separated because of a failure in the operations of the sheet separation device. The retreat conveyance path K7 also includes two conveyance guides (i.e. guide plates) facing each other.

Specifically, the two-ply sheet PJ is stacked on the first feed tray 11. The first feed roller 2 feeds the uppermost two-ply sheet PJ on the first feed tray 11 to the first conveyance roller pair 4, and the first conveyance roller pair 4 conveys the two-ply sheet PJ along the first conveyance path K1.

The insertion sheet PM is stacked on the second feed tray 12. The second feed roller 3 feeds the uppermost insertion sheet PM on the second feed tray 12 to the second conveyance path K2.

Each of the first to third conveyance roller pairs 4 to 6 includes a drive roller and a driven roller and conveys the sheet nipped in a nip between the drive roller and the driven roller. The third conveyance path K3 includes, from the upstream side, the second conveyance roller pair 5, the winding roller 20, and the third conveyance roller pair 6. The winding roller 20 and the third conveyance roller pair 6 is configured to be able to rotate in forward or in reverse. The third conveyance roller pair 6 can convey the sheet in the forward direction that is the left direction in FIG. 1 and in the reverse direction that is the right direction in FIG. 1. The third conveyance roller pair 6 also functions as an ejection roller pair that ejects the sheet to the ejection tray 13 or the purge tray 14.

Each of the first to fifth sensors 41 to 45 as a sheet detection sensor is a reflective photosensor that optically detects whether the sheet is present at the position of each sensor. The first sensor 41 is disposed in the vicinity of the downstream side of the first conveyance roller pair 4. The second sensor 42 is disposed in the vicinity of the downstream side of the second feed roller 3. The third sensor 43 is disposed in the vicinity of the downstream side of the second conveyance roller pair 5. The fourth sensor 44 is disposed in the vicinity of the downstream side of the winding roller 20 (that is the left side of the winding roller 20 in FIG. 1) and the upstream side of the third conveyance roller pair 6 (that is the right side of the third conveyance roller pair 6 in FIG. 1). The fifth sensor 45 is disposed downstream the third conveyance roller pair 6 (that is the left side of the third conveyance roller pair 6 in FIG. 1).

With reference to FIGS. 2A, 2B, 3A, 3B, 5B to 5D, and 6A, the winding roller 20 is described. In the winding roller 20, a gripper 32 that is one example of a gripper grips a gripped portion B of the two-ply sheet PJ at a winding start position W (see FIG. 5B). The gripped portion B is one end of the two-ply sheet PJ that is opposite an end at which the bonding portion A is formed. While the gripper 32 grips the gripped portion B of the two-ply sheet PJ, the winding roller 20 rotates in a predetermined rotation direction (counterclockwise in FIG. 5B) to wrap the two-ply sheet PJ around the winding roller 20. The winding roller 20 can rotate about a rotation shaft 20a in forward and in reverse. A controller controls a drive motor that drives the winding roller 20. The controller includes one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components.

Specifically, the two-ply sheet PJ starts from the first feed tray 11 and passes through the first conveyance path K1, and the second conveyance roller pair 5 conveys the two-ply sheet PJ in the forward direction along the third conveyance path K3. The two-ply sheet passes through the winding start position W of the winding roller 20 once and is conveyed to a position of the third conveyance roller pair 6 that is a position at which the back end of the two-ply sheet PJ passes through the fourth sensor 44 but does not pass through the third conveyance roller pair 6, that is, the position in front of the third conveyance roller pair 6. Thereafter, the third conveyance roller pair 6 rotates in reverse to convey the two-ply sheet PJ in the reverse direction to the position of the winding roller 20 (the winding start position W). The gripper 32 grips the two-ply sheet PJ, and the winding roller 20 rotates further counterclockwise in FIG. 1 to wrap the two-ply sheet PJ around the winding roller 20.

Figure 6A:
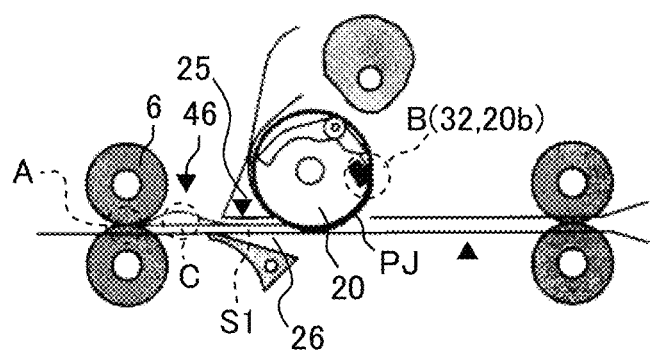
FIGS. 6A to 6C are schematic views of the main part of the sheet separation device illustrated in FIG. 1, illustrating operations of the sheet separation device, subsequent from the operations of FIGS. 5A to 5D.

With reference to FIG. 5C', when the two-ply sheet PJ is wound around the winding roller 20, a length of a sheet wound around the winding roller 20 is proportional to a distance from the center of the winding roller 20 to the sheet. Therefore, since a first sheet P1 is nearer to the center of the winding roller 20 than a second sheet P2, a length of the first sheet P1 wound around the winding roller 20 is shorter than a length of the second sheet P2 wound around the winding roller 20. As a result, misalignment occurs in a part of the two-ply sheet PJ other than the bonding portion A and the part in which the sheet P1 is in close contact with the sheet P2 (in other words, the part in which the sheet P1 sticks to the sheet P2). As illustrated in FIGS. 5D and 6A, the misalignment causes the upper first sheet P1 to slack and bend upward and forms a gap C between the two sheets P1 and P2 in the vicinity of the bonding portion A that is referred to as the other end of the two-ply sheet PJ. As described above, the two sheets P1 and P2 that are in close contact with each other without any gap are separated from each other.

In the present embodiment, in order to significantly form the gap C as described above, that is, to increase the difference between lengths of the sheets P1 and P2 wound around the winding roller 20, the two-ply sheet PJ is wound around the winding roller 20 at least once or more.

In the present embodiment, winding the two-ply sheet PJ around the winding roller 20 can separate the two-ply sheet PJ without increasing the size and cost of the sheet separation device 1.

As illustrated in FIG. 5B', the gripper 32 is configured to grip the gripped portion B of the two-ply sheet PJ without contacting the end surface of the one end of the gripped portion B on a member.

Specifically, the gripper 32 is configured to sandwich and grip the gripped portion B of the two-ply sheet PJ between the gripper 32 and a receiving portion 20b of the winding roller 20 without causing any member to abut and restrict the end surface of the one end of the two-ply sheet PJ, in other words, without causing any member to hit or contact the end surface of the two-ply sheet PJ. The receiving portion 20b is a part of an outer circumferential portion of the winding roller 20 and faces the gripper 32.

More specifically, the two-ply sheet PJ is not gripped and sandwiched by the gripper 32 and the receiving portion 20b in a state in which a specific member such as the gripper 32 abuts on the end surface of the one end (that is the tip of one end). Without abutting the end surface of the one end that is the tip of the one end to any member, the two-ply sheet PJ is sandwiched and gripped by the outer gripper 32 and the inner receiving portion 20b.

Compared with a structure that abuts the end surface of the tip of the two-ply sheet on a member, the above-described structure can reduce a disadvantage that the two-ply sheet PJ (particularly, the tip of one end) is damaged. Since a part of the two-ply sheet PJ including a damaged front end surface is hard for the laminating process, the configuration of the present disclosure is useful.

In the present embodiment, the bonding portion A of the two-ply sheet PJ wound around the winding roller 20 is the other end of the two-ply sheet PJ. The other end is opposite to the one end serving as the gripped portion B.

In the present embodiment, at least one of the gripper 32 and the receiving portion 20b is made of elastic material such as rubber.

Compared with a sheet separation device including the gripper 32 and the receiving portion 20b that are rigid bodies made of metal or resin, the above-described sheet separation device can increase a gripping force to grip the two-ply sheet PJ and prevent surfaces of the two-ply sheet PJ from being damaged. In particular, the sheet separation device 1 including the gripper 32 and the receiving portion 20b made of the elastic material easily exhibits the above-described effect.

As illustrated in FIGS. 2A to 3B, the moving mechanism 30 moves the gripper 32 between a gripping position (a position illustrated in FIGS. 2A and 3A) at which the gripper 32 can grip the two-ply sheet PJ and a releasing position (a position illustrated in FIGS. 2B and 3B) at which the gripper 32 is released from the gripping position.

Specifically, the moving mechanism 30 includes an arm 31, a compression spring 33 as a biasing member, a cam 34, and a motor that rotates the cam 34 in forward or in reverse.

The arm 31 holds the gripper 32, and the arm 31 and the gripper 32 are held together by the winding roller 20 to be rotatable about a support shaft 31a. In the present embodiment, the gripper 32 is connected to the tip of arm 31, and the gripper 32 and the arm 31 are made as one part. Alternatively, the gripper 32 and the arm 31 may be made as separate members, and the gripper 32 may be disposed on the arm 31, that is, may be held by the arm 31. In any case, the arm 31 holding the gripper 32 rotates around the rotation shaft 20a together with the winding roller 20.

Figure 2A:
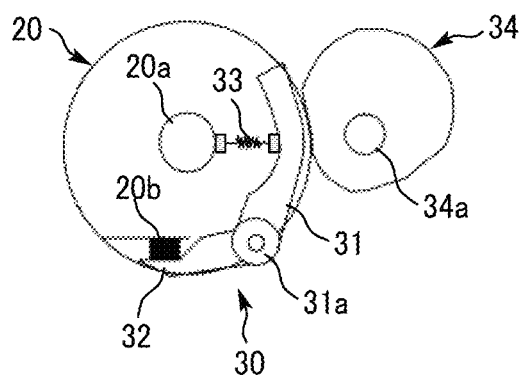
FIG. 2A is a side view illustrating a gripper that has moved to a gripping position in the sheet separation device illustrated in FIG. 1.
Figure 2B:
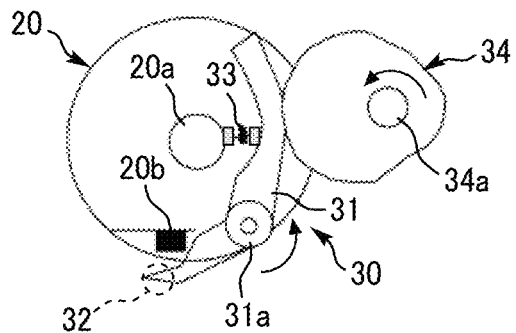
FIG. 2B is a side view illustrating the gripper that has moved to a releasing position in the sheet separation device illustrated in FIG. 1.

The compression spring 33 functions as a biasing member that biases the arm 31 so that the gripper 32 moves from the releasing position illustrated in FIG. 2B to the gripping position illustrated in FIG. 2A. Specifically, one end of the compression spring 33 is connected to a fixed part near the rotation shaft 20a, and the other end of the compression spring 33 is connected to one end of the arm 31 that is an end opposite to the other end of the arm 31 connected to the gripper 32 with respect to the support shaft 31a.

The cam 34 pushes the arm 31 against the biasing force of the compression spring 33 as the biasing member so that the gripper 32 moves from the gripping position illustrated in FIG. 2A to the releasing position illustrated in FIG. 2B. A motor controlled by the controller drives the cam 34 to rotate in forward or in reverse at a desired rotation angle. The cam 34 is held by the apparatus housing so as to be rotatable about a cam shaft 34a independently of the winding roller 20.

In the moving mechanism 30 configured as described above, as illustrated in FIGS. 2A and 3A, the arm 31 not contacting the cam 34 is biased by the compression spring 33 and presses the gripper 32 against the receiving portion 20b. This state is referred to as a closed state. In the closed state, the gripper 32 and the receiving portion 20b can grip the two-ply sheet PJ.

Figure 3A:
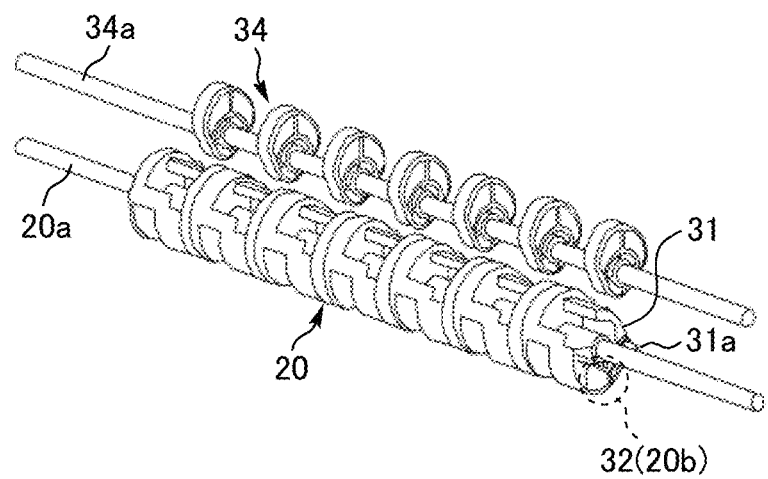
FIG. 3A is a perspective view illustrating the gripper that has moved to the gripping position in the sheet separation device illustrated in FIG. 1.
Figure 3B:
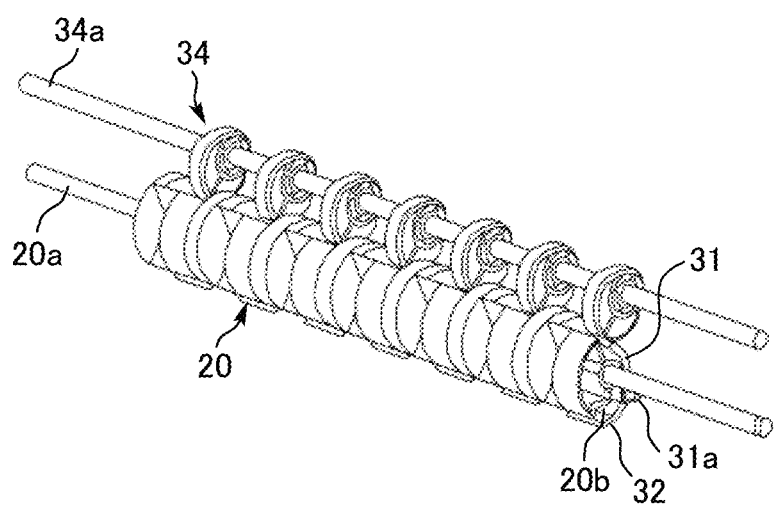
FIG. 3B is a perspective view illustrating the gripper that has moved to the releasing position in the sheet separation device illustrated in FIG. 1.

In contrast, as illustrated in FIGS. 2B and 3B, the arm 31 pressed by the cam 34 rotates counterclockwise in FIG. 2B about the support shaft 31a against the urging force of the compression spring 33 and separates the gripper 32 from the receiving portion 20b. This state is referred to as an open state. In the open state, the two-ply sheet PJ is not gripped, which is referred to as a grip release state.

In the present embodiment, as illustrated in FIGS. 3A and 3B, the winding roller 20 includes a plurality of roller portions (i.e. seven roller portions in the present embodiment) separated in the axial direction of the winding roller 20. Corresponding to the roller portions, the cam 34 includes a plurality of portions separated in the axial direction.

Setting portions separated in the axial direction to grip the two-ply sheet PJ as described above, that is, not setting entire area in the axial direction to grip the two-ply sheet PJ can share load necessary to grip the two-ply sheet PJ. The above-described configuration is useful when a necessary gripping force becomes large.

Figure 4B:
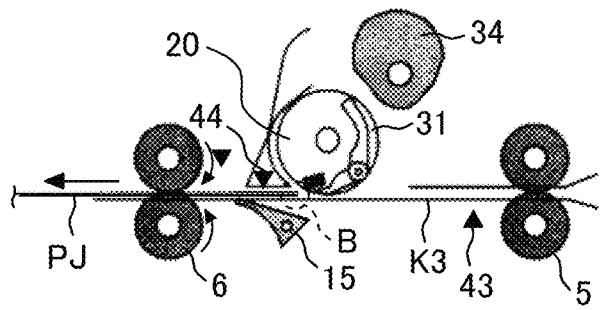
Figure 4C:
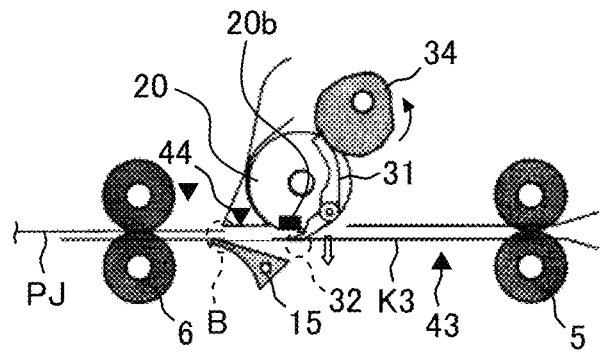
Figure 4D:
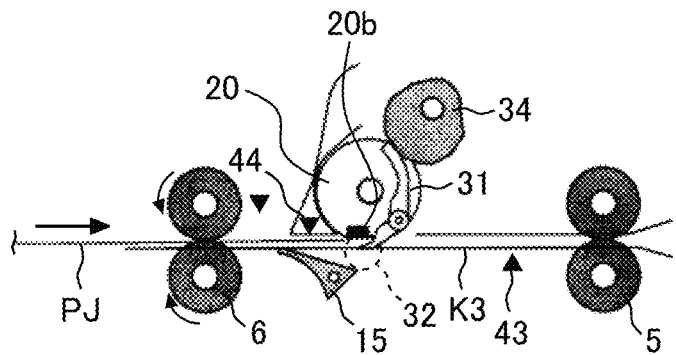

With reference to FIGS. 1, 4D, and 5A, the following describes the fourth sensor 44 in the sheet separation device 1 in the present embodiment. The fourth sensor 44 is the sheet detection sensor to detect two-ply sheet PJ conveyed between the winding roller 20 and the third conveyance roller pair 6. The fourth sensor 44 detects the front end of the two-ply sheet PJ conveyed from the third conveyance roller pair 6 to the winding roller 20. Based on results detected by the fourth sensor 44, the controller controls the moving mechanism 30.

Specifically, the fourth sensor 44 is disposed on the conveyance path between the winding roller 20 and the third conveyance roller pair 6. As illustrated in FIGS. 4D and 5A, the third conveyance roller pair 6 conveys the two-ply sheet PJ in reverse toward the position of the winding roller 20, so that the gripped portion B of the two-ply sheet PJ becomes a front end in the reverse direction conveyance, and the fourth sensor 44 detects the front end of the two-ply sheet PJ conveyed in reverse, that is, the tip of one end of the gripped portion B. The controller uses a timing at which the fourth sensor 44 detects the tip of one end of the gripped portion B as a trigger to adjust and control a timing to stop the two-ply sheet PJ at the gripping position and a timing at which the gripper 32 grips the gripped portion B. Specifically, after a predetermined time has passed since the fourth sensor 44 detected the front end of the two-ply sheet PJ, the third conveyance roller pair 6 stops the reverse direction conveyance of the two-ply sheet PJ, and the cam 34 rotates to pivot the arm 31 of the moving mechanism 30 so that the gripper 32 moves from the releasing position illustrated in FIG. 2B to the gripping position illustrated in FIG. 2A.

The above-described control accurately performs an operation in which the end surface of the two-ply sheet PJ is sandwiched by the gripper 32 and the receiving portion 20b without abutting the end surface of the two-ply sheet PJ on any member.

As described above, the third conveyance roller pair 6 conveys the tip of one end of the gripped portion B of the two-ply sheet as a front end toward the winding start position W of the winding roller 20 in the third conveyance path K3 between the third conveyance roller pair 6 and the winding roller 20.

With reference to FIGS. 6A to 6C, and 10A to 10C, the separation claws 16 as a separator is described. The separation claws 16 are claw-shaped members that move from standby positions illustrated in FIG. 10A and are inserted into the gap C formed between two sheets P1 and P2 at a predetermined position of the two-ply sheet. The predetermined position is a position at which the separation claw can enter the gap formed between the two sheets P1 and P2 and is determined by experiments. Preferably, the gap formed between the two sheets P1 and P2 becomes largest at the predetermined position in the sheet separation device 1.

Specifically, the separation claws 16 are inserted into the gap C formed between two sheets P1 and P2 and between the winding roller 20 and the third conveyance roller pair 6 from the standby positions outside both ends of the two-ply sheet PJ in the width direction of the two-ply sheet PJ in which the one end (that is the gripped portion B) is wound by the winding roller 20 and the other end (that is the bonding portion A) is nipped by the third conveyance roller pair 6.

Figure 6B:
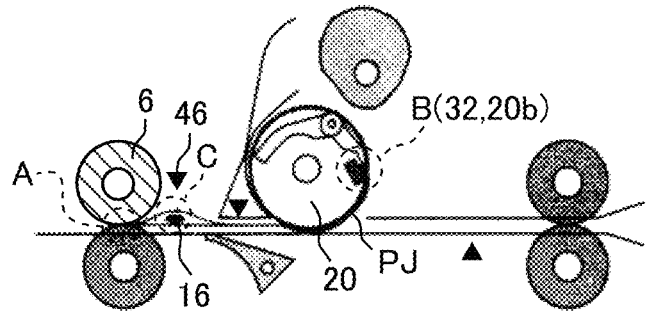
Figure 6C:
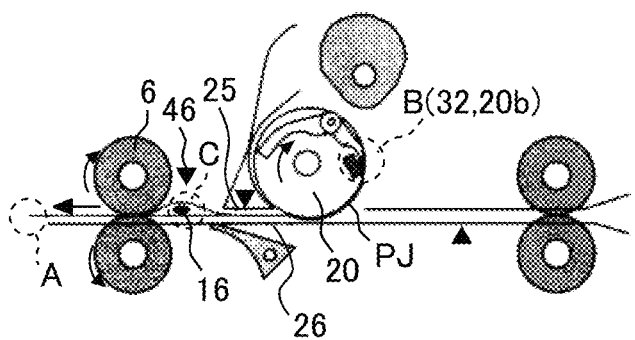
Figure 9:
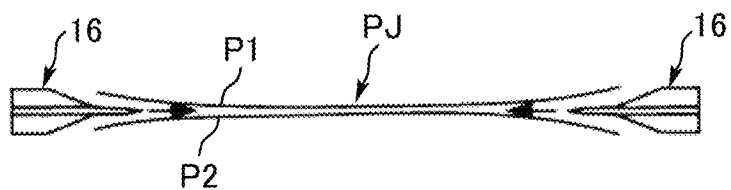
FIG. 9 is a schematic view illustrating separation claws inserted into a two-ply sheet in a width direction of the two-ply sheet.

More specifically, in the present embodiment, the separation claws 16 are disposed at both sides of the conveyance path in the width direction that is the direction perpendicular to a plane on which FIGS. 6A to 6C are illustrated and the horizontal direction in FIG. 9. The separation claw 16 has a fin extending in the vertical direction and a plate. In a direction in which the separation claw 16 is inserted into the two-ply sheet PJ, the plate has a tip at the center in a width direction of the plate and a back-end. Each of a plate thickness and a plate width in the plate gradually increases from the tip to the back-end. A vertical length of the fin gradually increases from the tip of the fin in the direction in which the separation claw 16 is inserted into the two-ply sheet PJ. Separation claws 16 are moved in the width direction of the two-ply sheet PJ by a driving device controlled by the controller.

Figure 18A:
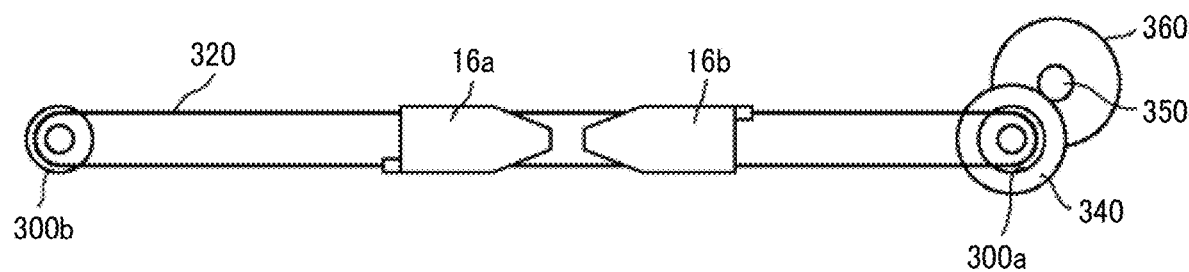
FIGS. 18A and 18B are schematic views illustrating examples of a driving device to move the separation claws.
Figure 18B:
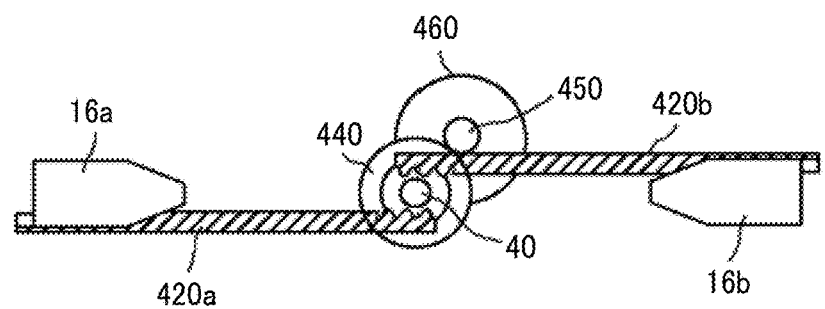

As illustrated in FIGS. 18A and 18B, the sheet separation device 1 according to the present embodiment includes two separation claws 16a and 16b disposed to face each other. In FIG. 18A, a belt driving device causes the two separation claws 16a and 16b to approach or move away from each other. In FIG. 18B, a rack and pinion driving device causes the two separation claws 16a and 16b to approach or move away from each other.

Specifically, the belt driving device in FIG. 18A includes a driving pulley 300a, a driven pulley 300b, and a belt 320 stretched between the driving pulley 300a and the driven pulley 300b. The two separation claws 16a and 16b are attached to the belt 320 to face each other. One separation claw 16a is connected to the lower side of the belt 320, and the other separation claw 16b is connected to the upper side of the belt 320.

The belt driving device includes a drive transmission gear 340 attached to the driving pulley 300a. The drive transmission gear 340 receives the rotational driving force of the drive motor 360 via the motor output gear 350 and transmits the rotational driving force to the belt 320.

In FIG. 18A, clockwise rotation of the drive motor 360 causes the separation claws 16a and 16b to approach each other, and counterclockwise rotation of the drive motor 360 causes the separation claws 16a and 16b to move away from each other.

The rack and pinion driving device in FIG. 18B includes a pinion 400 and two racks 420a and 420b extending in opposite directions and meshing with the pinion 400. The two separation claws 16a and 16b facing each other are attached to the racks 420a and 420b, respectively. The pinion 400 is attached a drive transmission gear 440. The drive transmission gear 440 receives the rotational driving force of the drive motor 460 via the motor output gear 450 and transmits the rotational driving force to the racks 420a and 420b.

In FIG. 18B, clockwise rotation of the drive motor 460 causes the separation claws 16a and 16b to approach each other, and counterclockwise rotation of the drive motor 460 causes the separation claws 16a and 16b to move away from each other.

The separation claws 16 configured as described above ordinarily stand by at standby positions illustrated in FIG. 10A at which the separation claws 16 do not interfere with the conveyance of the sheet such as the two-ply sheet PJ in the third conveyance path K3. Subsequently, as illustrated in FIGS. 9 and 10B, the separation claws 16 enter the gap C in the two-ply sheet PJ when the two-ply sheet PJ (configured by two sheets P1 and P2) is separated. As a result, the separation claws 16 secure the gap C to be large.

A moving device to move the separation claws 16 in the width direction of the two-ply sheet PJ may employ a known rack and pinion mechanism, for example.

The above-described mechanism including the winding roller 20 winding the two-ply sheet and the separation claws 16 inserted into the two-ply sheet PJ to separate the two-ply sheet PJ can reduce the size of the sheet separation device as compared with a mechanism using a large-scale device such as a vacuum device to separate the two-ply sheet PJ. That is, without increasing the size of the sheet separation device 1, the above-described mechanism can satisfactorily separate the two sheets P1 and P2 constituting the two-ply sheet PJ.

Figure 7A:
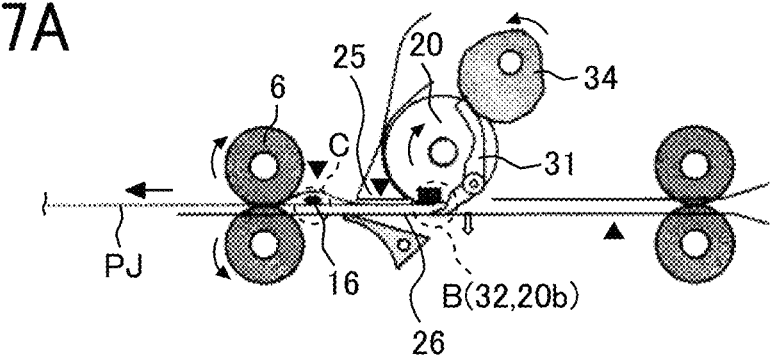
FIGS. 7A to 7C are schematic views of the main part of the sheet separation device illustrated in FIG. 1, illustrating operations of the sheet separation device, subsequent from the operations of FIGS. 6A to 6C.
Figure 7B:
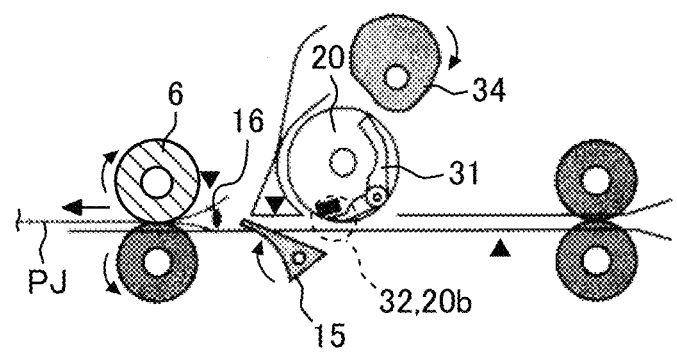
Figure 7C:
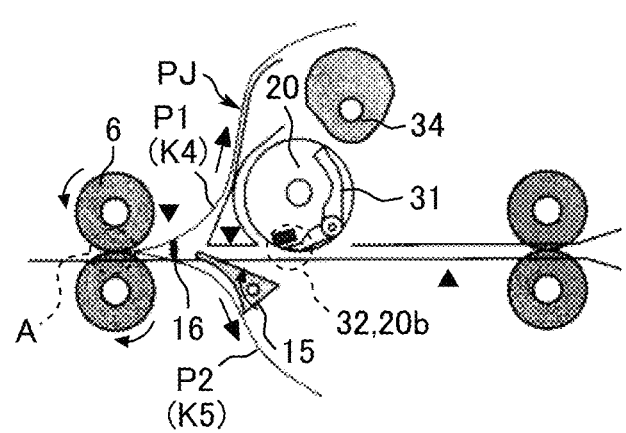

With reference to FIGS. 7A to 7C, the switching claws 15 as a divider are described. The switching claws 15 are claw-shaped members movable to a position to guide the two sheets P1 and P2 separated from the two-ply sheet PJ by the separation claws 16 to the two branched conveyance paths K4 and K5, respectively. The two branched conveyance paths K4 and K5 are branched from the third conveyance path K3 in different directions between the separation claws 16 and the winding roller 20, and the third conveyance path K3 is sandwiched by the two branched conveyance paths K4 and K5.

Specifically, in the present embodiment, the switching claws 15 are a plurality of claws divided with a gap therebetween in the width direction that is the direction perpendicular to a plane on which FIGS. 7A to 7C are illustrated. The switching claws 15 are configured to be rotatable about a support shaft. The controller controls a driving device that rotates the switching claws 15.

The switching claws 15 configured as described above ordinarily stand by at standby positions as illustrated in FIG. 7A at which the switching claws 15 do not interfere with the conveyance of the sheets such as the two-ply sheet PJ in the third conveyance path K3. When the switching claws 15 guide the two sheets P1 and P2 separated from the two-ply sheet PJ by the separation claw 16 to the branched conveyance paths K4 and K5, respectively, the switching claws 15 rotate to positions at which the switching claws 15 prevent the two-ply sheet PJ from entering the third conveyance path K3 when viewed from the two-ply sheet PJ as illustrated in FIG. 7B.

As a result, the first sheet P1 is guided to the first branched conveyance path K4, and the second sheet P2 is guided to the second branched conveyance path K5.

Figure 8A:
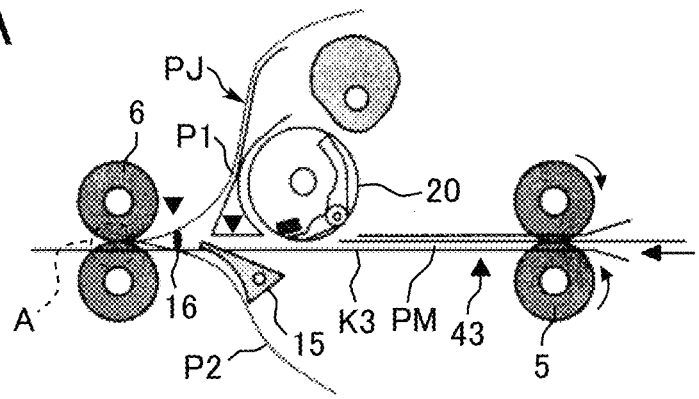
FIGS. 8A to 8C are schematic views of the main part of the sheet separation device illustrated in FIG. 1, illustrating operations of the sheet separation device, subsequent from the operations of FIGS. 7A to 7C.
Figure 8B:
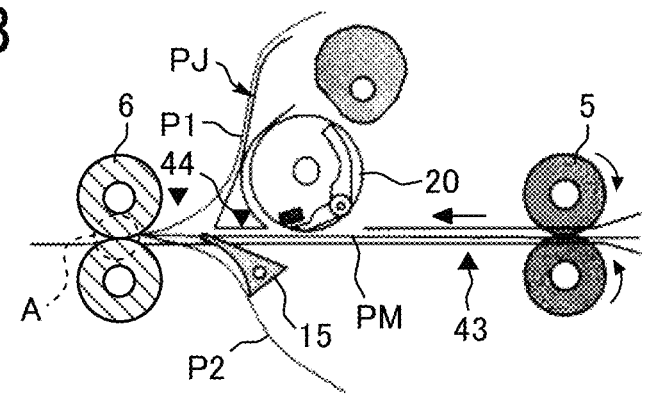
Figure 8C:
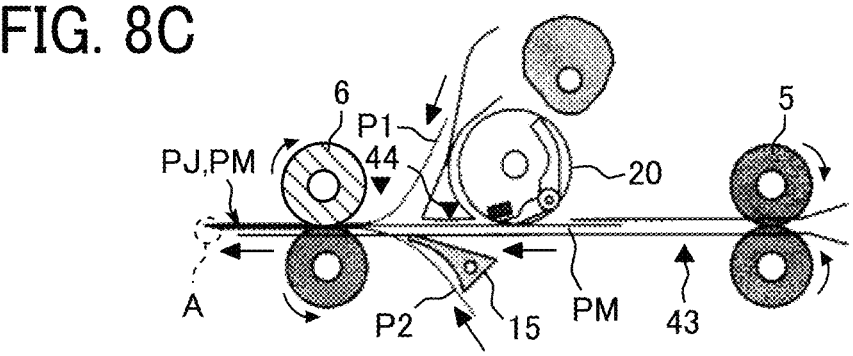

Specifically, the third conveyance roller pair 6 conveys the other end of the two-ply sheet PJ to the left side in FIG. 7A after the separation claws 16 are inserted into the gap C to release winding the one end of the two-ply sheet PJ around the winding roller 20. After the third conveyance roller pair 6 conveys the two-ply sheet PJ at a position at which the one end of the two-ply sheet PJ (i.e. the back end of the two-ply sheet PJ) is between the switching claws 15 and the separation claws 16, the switching claws 15 rotates clockwise in FIG. 7B about the support shaft, the third conveyance roller pair 6 conveys the one end of the two-ply sheet PJ to the right side as illustrated in FIG. 7C again, and the switching claws 15 guide the first sheet P1 separated by the separation claws 16 to the first branched conveyance path K4 and guide the second sheet P2 to the second branched conveyance path K5. Subsequently, as illustrated in FIGS. 8A to 8C, the second conveyance roller pair 5 conveys the insertion sheet PM to the third conveyance path K3, that is, the right side in FIGS. 8A to 8C to insert the insertion sheet PM between the two sheets P1 and P2 separated from the two-ply sheet PJ.

With reference to FIGS. 6A to 6C, the first guide 25 is described below. The first guide 25 is disposed between the separation claws 16 and the winding roller 20 in the third conveyance path K3 and functions as an inner limiter to limit an amount of slack of the first sheet P1 that is an inner sheet of the two sheet P1 and P2 of the two-ply sheet PJ wound around the winding roller 20.

Specifically, the first guide 25 as the inner limiter is a conveyance guide disposed on the side in which the winding roller 20 is disposed with respect to a theoretical plane S1, that is, above the theoretical plane S1 in FIG. 6A, in the third conveyance path. The theoretical plane S1 is a theoretical plane passing through the winding start position W of the winding roller 20 and the nip of the third conveyance roller pair 6 in the third conveyance path (see FIG. 6A). The first guide 25 has a shape like a triangular prism having a plane along the outer circumferential surface of the winding roller 20, and the plane covers a part of the outer circumferential surface of the winding roller 20 and is separated from the winding roller 20 by a predetermined gap. The first guide 25 functions as a conveyance guide of the third conveyance path K3 and a conveyance guide of the first branched conveyance path K4. That is, the first guide 25 guides the sheet conveyed on the third conveyance path K3, the sheet conveyed on the first branched conveyance path K4, and the sheet wound around the winding roller 20.

In the third conveyance path K3, the first guide 25 limits bending the two-ply sheet PJ upward (in particular, bending the first sheet P1 upward) between the winding roller 20 and the third conveyance roller pair 6. Therefore, the gap C in the two-ply sheet PJ that is mainly formed by bending the first sheet P1 upward is intensively formed between an end of the first guide 25 and the third conveyance roller pair 6. Accordingly, the above-described configuration can increase the size of the gap C even if the winding amount of the two-ply sheet PJ wound around the winding roller 20 is not large, and the separation claws 16 can smoothly enter the gap C to separate the two-ply sheet PJ.

With reference to FIGS. 6A to 6C, the second guide 26 is described below. The second guide 26 is disposed between the separation claws 16 and the winding roller 20 in the third conveyance path K3 and functions as a guide to guide the second sheet P2 that is an outer sheet of the two sheet P1 and P2 of the two-ply sheet PJ wound around the winding roller 20.

Specifically, the second guide 26 as the guide is a conveyance guide disposed on the side in which the winding roller 20 is not disposed with respect to the theoretical plane S1, that is, below the theoretical plane S1 in FIG. 6A, in the third conveyance path. The second guide 26 is disposed to face the lower surface of the sheet from a portion upstream from the second conveyance roller pair 5 to a portion downstream from the third conveyance roller pair 6 in the forward direction. That is, the second guide 26 guides the sheet conveyed on the third conveyance path K3.

In the third conveyance path K3 between the winding roller 20 and the third conveyance roller pair 6, a clearance between the first guide 25 and the second guide 26 is set to be a value by which the sheet having the largest thickness can be conveyed to limit a gap between the sheets P1 and P2 of the two-ply sheet PJ between the first guide 25 and the second guide 26 not to be too large. Therefore, the gap C in the two-ply sheet PJ that is mainly formed by bending the first sheet P1 upward is intensively formed between the end of the first guide 25 and the third conveyance roller pair 6.

Accordingly, the separation claws 16 can smoothly enter the gap C to separate the two-ply sheet PJ.

With reference to FIGS. 6A to 6C and 13A to 13C, the abnormality detection sensor 46 is described below. The abnormality detection sensor 46 functions as an abnormality detection device to detect an abnormal state in which the gap C formed between the two sheets P1 and P2 at a predetermined position (that is between the third conveyance roller pair 6 and the winding roller 20) is not larger than a predetermined size before movements of the separation claws 16 from the standby positions (that is, movements from the standby positions illustrated in FIG. 10A to separation positions illustrated in FIGS. 9 and 10B). The predetermined size is a size of the gap C into which the separation claw 16 can enter and is determined by experiments. That is, the abnormality detection sensor 46 as the abnormality detection device detects the abnormal state in which the gap C formed between the two sheets P1 and P2 at a predetermined position is not larger than the predetermined size before the separation claws 16 are inserted into the gap C.

In other words, at a timing at which the gap C is formed between the two sheets P1 and P2 as illustrated in FIGS. 5D and 6A, the abnormality detection sensor 46 as the abnormality detection device detects the abnormal state such as a state in which the gap is not formed at all or a state in which the gap is not formed as a sufficient gap C.

Figure 13A:
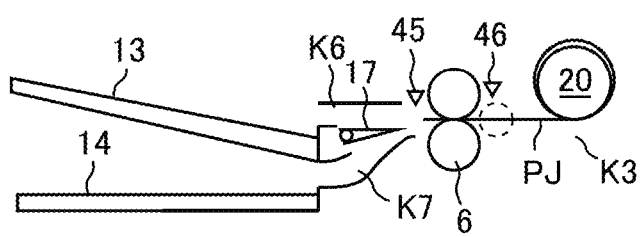
FIGS. 13A to 13C are schematic views of the main part of the sheet separation device illustrated in FIG. 1, illustrating operations of the sheet separation device when an abnormal state is detected.
Figure 13B:
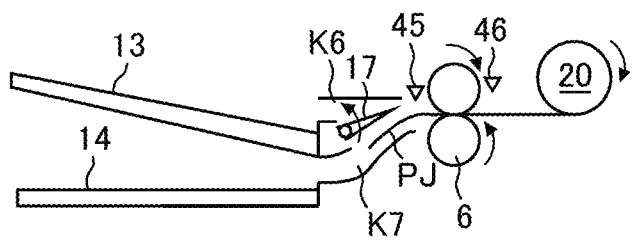
Figure 13C:
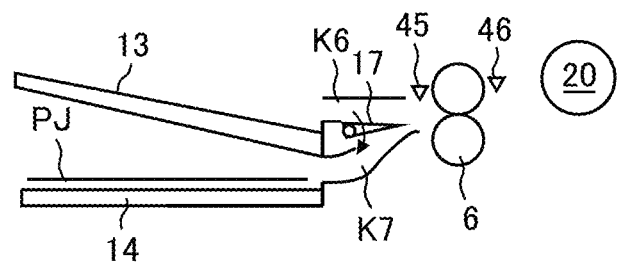

The above-described abnormality detection sensor 46 as the abnormality detection device may be a lever type sensor that comes into contact with the upper first sheet P1 of the two-ply sheet PJ forming the gap C larger than the predetermined size, an optical sensor that optically detects a distance between the optical sensor and the upper first sheet P1 of the two-ply sheet PJ at the predetermined position illustrated in FIGS. 13A to 13C, or an imaging element that images the two-ply sheet PJ at the predetermined position illustrated in FIGS. 13A to 13C.

In the lever type sensor used as the abnormality detection sensor 46, the upper first sheet P1 of the two-ply sheet PJ forming the gap C larger than the predetermined size pushes the lever of the lever type sensor, and the lever blocks light detected by a photosensor is blocked by the lever, causing change in sensor output. Therefore, when the sensor output does not change even at the timing at which the gap C is formed, the abnormal state in which the gap C is not sufficiently formed is detected.

In the optical sensor such as a rangefinder used as the abnormality detection sensor 46, forming the gap C larger than the predetermined size causes a distance between the upper first sheet P1 and the optical sensor to be smaller than or equal to a predetermined value. Therefore, when the distance between the upper first sheet P1 and the optical sensor is not smaller than or equal to the predetermined value, the abnormal state in which the gap C is not sufficiently formed is detected.

The imaging element used as the abnormality detection sensor 46 directly images a state forming the gap C larger than the predetermined size. Therefore, when the state forming the gap C larger than the predetermined size is not imaged even at the timing at which the gap C is formed, the abnormal state in which the gap C is not sufficiently formed is detected.

The fifth sensor 45 is described below. The fifth sensor 45 is disposed downstream from the third conveyance roller pair 6 in the forward direction (that is the left side in FIGS. 13A to 13C) to detect the two-ply sheet PJ.

The fifth sensor 45 detects a position of the two-ply sheet PJ in the conveyance direction. Based on results detected by the fifth sensor 45, the controller determines a timing of the abnormality detection sensor 46 to detect whether the abnormal state occurs or not. That is, the controller determines the timing at which the gap C as illustrated in FIGS. 5D and 6A is formed based on the results detected by the fifth sensor 45 and, at the timing, whether the abnormal state occurs based on detection results of the abnormality detection sensor 46.

A sensor to determine the timing at which the gap C is formed is not limited to the fifth sensor 45. The controller may determine the timing based on results detected by the fourth sensor 44.

In the present embodiment, the controller controls the movements of the separation claws 16 based on the detection results regarding the abnormal state detected by the abnormality detection sensor 46 as the abnormality detection device.

Specifically, the controller stops the movements of the separation claws 16 from the standby positions when the controller determines that the abnormal state in which the gap C is not sufficiently formed in the two-ply sheet PJ occurs based on the results detected by the abnormality detection sensor 46 as the abnormality detection device.

That is, when the controller determines that the abnormal state in which the gap C is not sufficiently formed in the two-ply sheet PJ occurs based on the results detected by the abnormality detection sensor 46 at the timing at which the two-ply sheet PJ typically has the sufficiently large gap C, the controller holds the separation claws 16 at the standby positions illustrated in FIG. 10A without moving the separation claws 16 to the separation positions illustrated in FIG. 10B. In other words, when the abnormal state is detected, the sheet separation operations of the separation claws 16 is not performed.

The above-described control prevents a disadvantage that the two-ply sheet PJ is damaged by separating two sheets P1 and P2 of the two-ply sheet PJ not having sufficiently large gap C therebetween.

Specifically, when the separation claws 16 perform the separation operation on the two sheets P1 and P2 not having the sufficiently large gap C therebetween, the separation claws 16 cannot enter the gap C and hit end surfaces (side end surfaces) of the sheets P1 and P2. As a result, the two-ply sheet PJ is damaged or buckled, and not only the appearance is deteriorated, but also the insertion sheet PM cannot be inserted thereafter. Additionally, the separation claw 16 itself may be damaged.

In such a case, since the separation claws 16 cannot satisfactorily separate the two-ply sheet PJ (that is, a separation failure occurs), the insertion sheet PM cannot enter between the two sheets P1 and P2 thereafter.

In contrast, in the present embodiment, the abnormality detection sensor 46 detects the abnormality of the two-ply sheet PJ before the occurrence of the above-described disadvantage, preventing the occurrence of the above-described disadvantage.

An example of causes that prevent formation of the sufficiently large gap C is a setting failure of the two-ply sheet PJ in the first feed tray 11 (for example, setting the two-ply sheet PJ in a wrong orientation such as setting the two-ply sheet PJ so that the bonding portion A is set at the position of the side end surface), or a mechanical operation failure such as a winding failure of the winding roller 20.

With reference to FIGS. 1 and 13A to 13C, the retreat conveyance path K7 is described. The sheet separation device 1 according to the present embodiment includes the retreat conveyance path K7 branched from the fourth conveyance path K6 on which the two-ply sheet PJ under a normal state is conveyed after the separation claws 16 move from the standby positions illustrated in FIG. 10A. That is, the retreat conveyance path K7 branches off from the fourth conveyance path K6 that is an ejection path to eject the two-ply sheet PJ normally separated after the separation claws 16 are inserted into the gap C.

At a branch portion between the fourth conveyance path K6 and the retreat conveyance path K7, the bifurcating claw 17 rotatable about a support shaft is disposed to switch the conveyance path of the two-ply sheet PJ conveyed in the forward direction by the third conveyance roller pair 6.

In addition, below the ejection tray 13, the sheet separation device 1 includes the purge tray 14 as a purge portion capable of storing the two-ply sheet PJ conveyed through the retreat conveyance path K7.

When the controller determines that the abnormal state occurs based on the results detected by the abnormality detection sensor 46 as the abnormality detection device (that is, when the tow-ply sheet does not have the sufficiently large gap C), the controller controls the bifurcating claw 17 that is a separator as a conveyance path switching device to switch a conveyance path of the two-ply sheet PJ under the abnormal state to the retreat conveyance path K7 in response to the abnormal state detected by the abnormality detection sensor 46.

That is, when the abnormal state is detected, the two-ply sheet PJ is not subjected to the sheet separation operations of the separation claws 16 and insertion operations to insert the insertion sheet PM and is ejected and placed on the purge tray 14 via the retreat conveyance path K7 instead of the ejection tray 13.

Specifically, the normally processed two-ply sheet PJ is guided to the fourth conveyance path K6 by the bifurcating claw 17 disposed at a rotational position (that is a reference position) in FIG. 1 and is conveyed toward the ejection tray 13. In contrast, when the two-ply sheet PJ is not normally processed, the bifurcating claw 17 pivots from the reference position illustrated in FIG. 13A to a rotational position illustrated in FIG. 13B to guide the two-ply sheet PJ to the retreat conveyance path K7 and convey the two-ply sheet PJ to the purge tray 14.

The above-described operations can sort the two-ply sheet PJ that is normally separated and includes the insertion sheet PM inserted into the two-ply sheet PJ and the two-ply sheet PJ that is not normally separated and does not include the insertion sheet PM. As a result, the above-described operations improve user convenience because the two-ply sheet PJ that is abnormally processed is not mixed with the two-ply sheet PJ that is normally processed.

The controller performs a switching operation (rotation) of the bifurcating claw 17 from the reference position illustrated in FIG. 13A to the rotational position illustrated in FIG. 13B using a trigger that is a timing at which the fifth sensor 45 detects the front end of the two-ply sheet conveyed in the forward direction after the abnormality detection sensor 46 detects the abnormality of the two-ply sheet PJ.

However, the switching operation (rotation) of the bifurcating claw 17 is not limited to this. The controller may switch rotational positions of the bifurcating claw 17 from the rotational position illustrated in FIG. 13B as the reference position to the rotational position illustrated in FIG. 13A only when the two-ply sheet into which the insertion sheet PM is inserted is ejected onto the ejection tray 13 using the trigger that is the timing at which the fifth sensor 45 detects the front end of the two-ply sheet conveyed in the forward direction.

In the present embodiment, the controller notifies the occurrence of the abnormal state when the abnormal state is detected by the abnormality detection sensor 46 that is the abnormality detection device.

Specifically, as illustrated in FIG. 1, the sheet separation device 1 includes an operation display panel 49 as an operation display device on the exterior of the sheet separation device 1 to display various kinds of information about the sheet separation device 1 and input various kinds of commands. When the controller determines that the abnormal state occurs based on the results detected by the abnormality detection sensor 46, that is, when the two-ply sheet does not have the sufficiently large gap C, the controller controls the operation display panel 49 to display that the abnormal state is detected. For example, the operation display panel 49 displays "Since an abnormality has occurred, the process of inserting the insertion sheet is stopped, and the two-ply sheet is ejected to the purge tray. Please check the setting direction of the two-ply sheet in the first feed tray. If the setting direction is correct and similar abnormalities are repeated, please contact a service person."

With reference to FIGS. 4A to 8C, the following describes operations of the sheet separation device 1 to separate the two-ply sheet PJ.

In the description of the operations, operations of the separation claws 16 are appropriately described with reference to FIGS. 9 and 10A to 10C, and the control flow is described with reference to a flowchart of FIG. 11, that is, FIGS. 11A and 11B.

In addition, with reference to FIGS. 13A to 13C, a description is given of operations when the abnormal state in the two-ply sheet PJ is detected. In the description of the operations, the control flow is described with reference to a flowchart of FIG. 12.

Figure 11A:
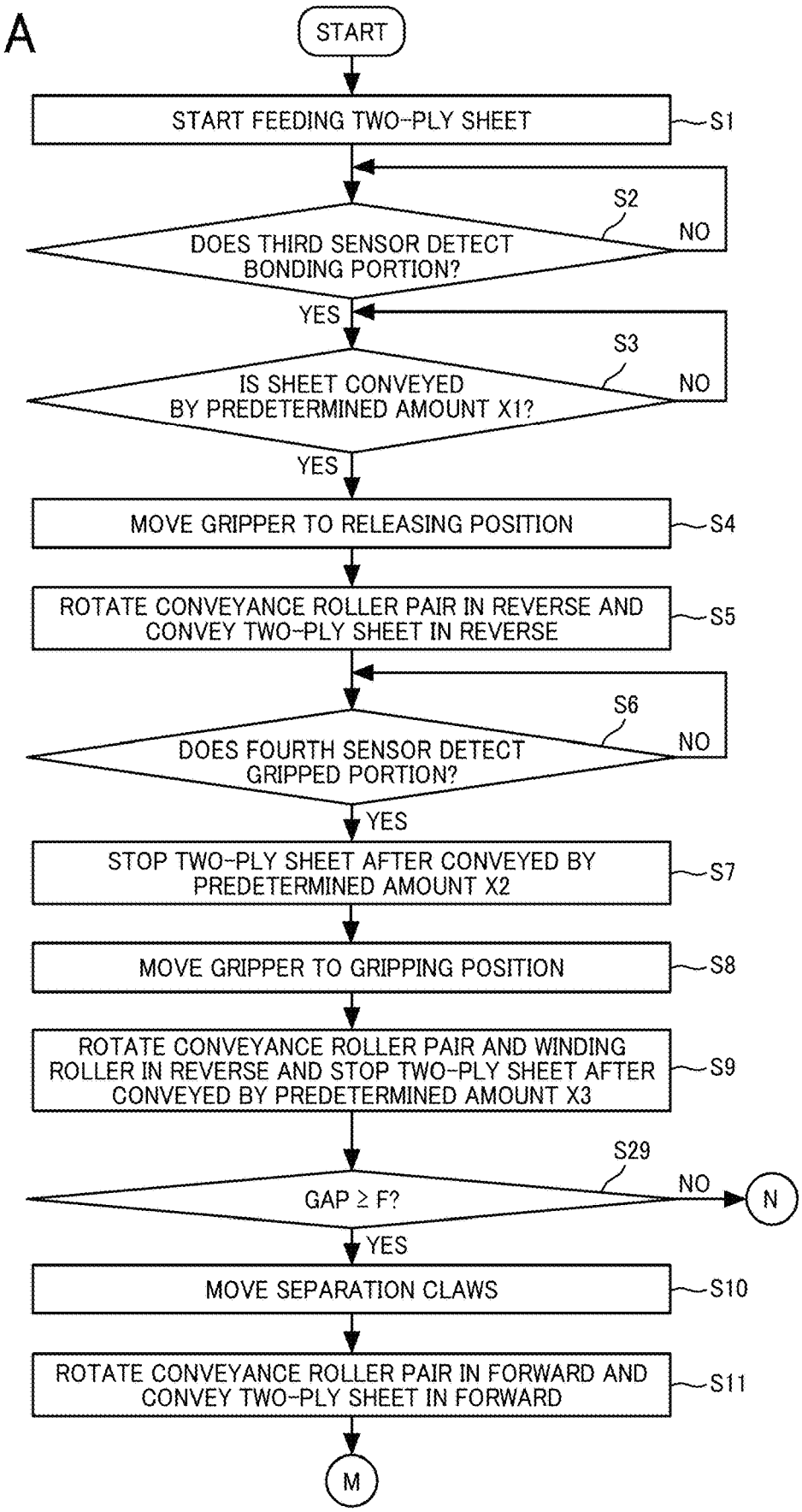
FIGS. 11A and 11B is a flowchart illustrating control performed in the sheet separation device.

After the first feed roller 2 and the first conveyance roller pair 4 starts feeding the two-ply sheet PJ from the first feed tray 11 in step S1 of FIG. 11A, as illustrated in FIG. 4A, the second conveyance roller pair 5 conveys the two-ply sheet PJ with the bonding portion A as a front end in the forward direction that is a direction from the right side to the left side in FIG. 4A in the third conveyance path K3.

At this time, the controller controls the moving mechanism 30 so that the gripper 32 is positioned at the gripping position. That is, the cam 34 moves to a rotational position at which the cam 34 does not push the arm 31. When the gripper 32 is positioned at the gripping position as described above, the gripper 32 does not interfere the sheet conveyance in the third conveyance path K3. In addition, the switching claws 15 stand by at the standby positions at which the switching claws 15 do not interfere with the conveyance of the sheets in the third conveyance path K3 as illustrated in FIG. 10A. The bifurcating claw 17 is located at the reference position illustrated in FIG. 1.

Subsequently, the controller determines whether the third sensor 43 detects the bonding portion A of the two-ply sheet PJ (that is a front end of the two-ply sheet PJ conveyed in the forward direction and the other end of the two-ply sheet PJ) in step S2 of FIG. 11A. The controller uses a timing at which the third sensor 43 detects the bonding portion A as a trigger and, as illustrated in FIG. 4B, the controller controls the third conveyance roller pair 6 to convey the two-ply sheet PJ in the forward direction by a predetermined amount X1 until the gripped portion B of the two-ply sheet PJ (that is the one end of the two-ply sheet PJ and a back end of the two-ply sheet PJ conveyed in the forward direction) passes through the position of the winding roller 20 in step S3 of FIG. 11A.

As illustrated in FIG. 4C, the controller temporarily stops the third conveyance roller pair 6 to stop the conveyance of the two-ply sheet PJ conveyed by the predetermined amount X1 and controls the gripper 32 to move from the gripping position to the releasing position in step S4 of FIG. 11A. That is, the cam 34 moves to a rotational position at which the cam 34 pushes the arm 31. In this state, the gripped portion B of the two-ply sheet PJ can be received between the gripper 32 and the receiving portion 20b.

Then, as illustrated in FIG. 4D, the third conveyance roller pair 6 rotates in reverse to start conveyance of the two-ply sheet PJ in the reverse direction in step S5 of FIG. 11A. At this time, the fourth sensor 44 detects the gripped portion B of the two-ply sheet PJ that is the one end of the two-ply sheet PJ and the front end of the two-ply sheet PJ conveyed in the reverse direction.

Subsequently, as illustrated in FIG. 5A, the controller uses the timing at which the fourth sensor 44 detects the gripped portion B of the two-ply sheet PJ as a trigger in step S6 of FIG. 11A and stops the conveyance of the two-ply sheet PJ in step S7 of FIG. 11A at a timing at which the third conveyance roller pair 6 conveys the two-ply sheet PJ by a predetermined amount X2 that is a timing at which the gripped portion B of the two-ply sheet PJ reaches the position of the winding roller 20 that is the winding start position W.

After the gripped portion B reaches the winding start position W, as illustrated in FIG. 5B, the gripper 32 is moved from the releasing position to the gripping position in step S8 of FIG. 11A. That is, the cam 34 moves to a rotational position at which the cam 34 does not push the arm 31. In this state, as illustrated in FIG. 5B', the end surface of the one end of the two-ply sheet PJ does not abut on any member, and the gripped portion B is gripped between the gripper 32 and the receiving portion 20b.

Next, as illustrated in FIG. 5C, the winding roller 20 rotates in reverse (that is, counterclockwise) while the gripper 32 grips the two-ply sheet PJ, and the third conveyance roller pair 6 again rotates in reverse together with the winding roller 20. As the winding roller 20 rotates, the gap C is formed between the two sheets P1 and P2 of the two-ply sheet PJ between the winding roller 20 and the third conveyance roller pair 6 as illustrated in FIG. 5D. While the gap C is formed, the first guide 25 and the second guide 26 limit the bend of the two-ply sheet PJ in the vicinity of the winding roller 20. Accordingly, the gap C of the two-ply sheet PJ is intensively formed near the third conveyance roller pair 6.

Since the controller uses the timing at which the fourth sensor 44 disposed downstream from the third conveyance roller pair 6 in the reverse direction detects the gripped portion B of the two-ply sheet PJ conveyed in the reverse direction as the trigger to determine the timing at which the gripper 32 and the receiving portion 20b grip the gripped portion B, the gripped portion B of the two-ply sheet PJ can be accurately conveyed to a desired gripping position regardless of variations in sheet lengths with respect to the sheet conveyance amount X2 (Note that the size of sheets includes an error even if the sheets are sold as the same size).

The fourth sensor 44 can shorten the sheet conveyance amount X2 that is measured since the fourth sensor 44 detects the front end of the two-ply sheet PJ conveyed in the reverse direction regardless of the sheet length. Therefore, the above-described configuration can reduce variation in the conveyance amount X2 and enables an accurate conveyance of the gripped portion B of the two-ply sheet PJ to the desired gripping position.

Accordingly, the fourth sensor 44 is preferably disposed near the winding roller 20.

With reference to FIG. 5C', a mechanism that winding the two-ply sheet PJ around the winding roller 20 generates the gap C in the two-ply sheet PJ between the winding roller 20 and the third conveyance roller pair 6 is described above.

The following additionally describes the mechanism.

In the two-ply sheet PJ wound around the winding roller 20, the gripped portion B of the two-ply sheet PJ gripped by the gripper 32 does not generate a slip between the sheets P1 and P2. However, winding the two-ply sheet PJ around the winding roller 20 generates the difference in winding circumferential length between the two sheets P1 and P2 and, therefore, causes a slip between the two sheets P1 and P2, and a conveyance amount of the inner sheet P1 is smaller than a conveyance amount of the outer sheet P2. As a result, slack occurs in the inner sheet P1 between the nip of the third conveyance roller pair 6 and the winding roller 20. Winding the two-ply sheet PJ around the winding roller 20 one or more times additionally generates the difference in winding circumferential length between the inner circumference and the outer circumference by the thickness of the sheet and increases the slack.

Specifically, a distance from the rotation shaft 20a (i.e. the center of the shaft) of the winding roller 20 to the outer sheet P2 is $R+\Delta R$ when a distance from the rotation shaft 20a (i.e. the center of the shaft) of the winding roller 20 to the inner sheet P1 is R, and the thickness of the inner sheet P1 is $\Delta R$. The difference between a radius of the inner sheet P1 wound around the winding roller 20 and a radius of the outer sheet P2 wound around the inner sheet P1, that is, the thickness of the inner sheet P1 $\Delta R$, generates a circumferential length difference of $2\times\Delta R\times\pi$ when the two-ply sheet PJ is wound around the winding roller 20 by one round. Therefore, winding the two-ply sheet PJ around the winding roller 20 M times generates the circumferential length difference $2\times\Delta R\times\pi\times M$ that is a slack of the inner sheet P1.

Finally, the slack is accumulated between the third conveyance roller pair 6 and the winding roller 20, and the gap C corresponding to $2\times\Delta R\times\pi M$ is formed between the two sheets P1 and P2.

In step S9 of FIG. 11A, after the winding roller 20 starts the winding of the two-ply sheet PJ, as illustrated in FIG. 6A, the third conveyance roller pair 6 stops the conveyance of the two-ply sheet PJ and the winding roller 20 stops the winding of the two-ply sheet PJ at the timing at which the third conveyance roller pair 6 conveys the two-ply sheet by a predetermined amount X3. In this state, the two-ply sheet PJ is wound around the winding roller 20 one or more times, and the gap C in the two-ply sheet PJ (a distance between the sheet P1 and the sheet P2) is sufficiently widened if the two-ply sheet PJ is normally separated.

When the gap C is widened, the controller determines whether the gap C formed in the two-ply sheet PJ is equal to or larger than a predetermined size F based on results detected by the abnormality detection sensor 46 in step S29 of FIG. 11A.

When the controller determines that the gap C is the sufficiently large gap equal to or larger than the predetermined size F, the controller determines that subsequent separation operations of the separation claws 16 does not cause a problem and controls the separation claws 16 to insert into the gap C sufficiently widened in the two-ply sheet PJ as illustrated in FIG. 6B in step S10 of FIG. 11A. That is, as illustrated in FIGS. 9 and 10A to 10C, each of the pair of separation claws 16 moves from the standby position to the separation position.

Next, as illustrated in FIG. 6C, the third conveyance roller pair 6 and the winding roller 20 start rotating in forward, that is, clockwise in step S11 of FIG. 11A after the separation claws 16 are inserted into the gap C.

Figure 11B:
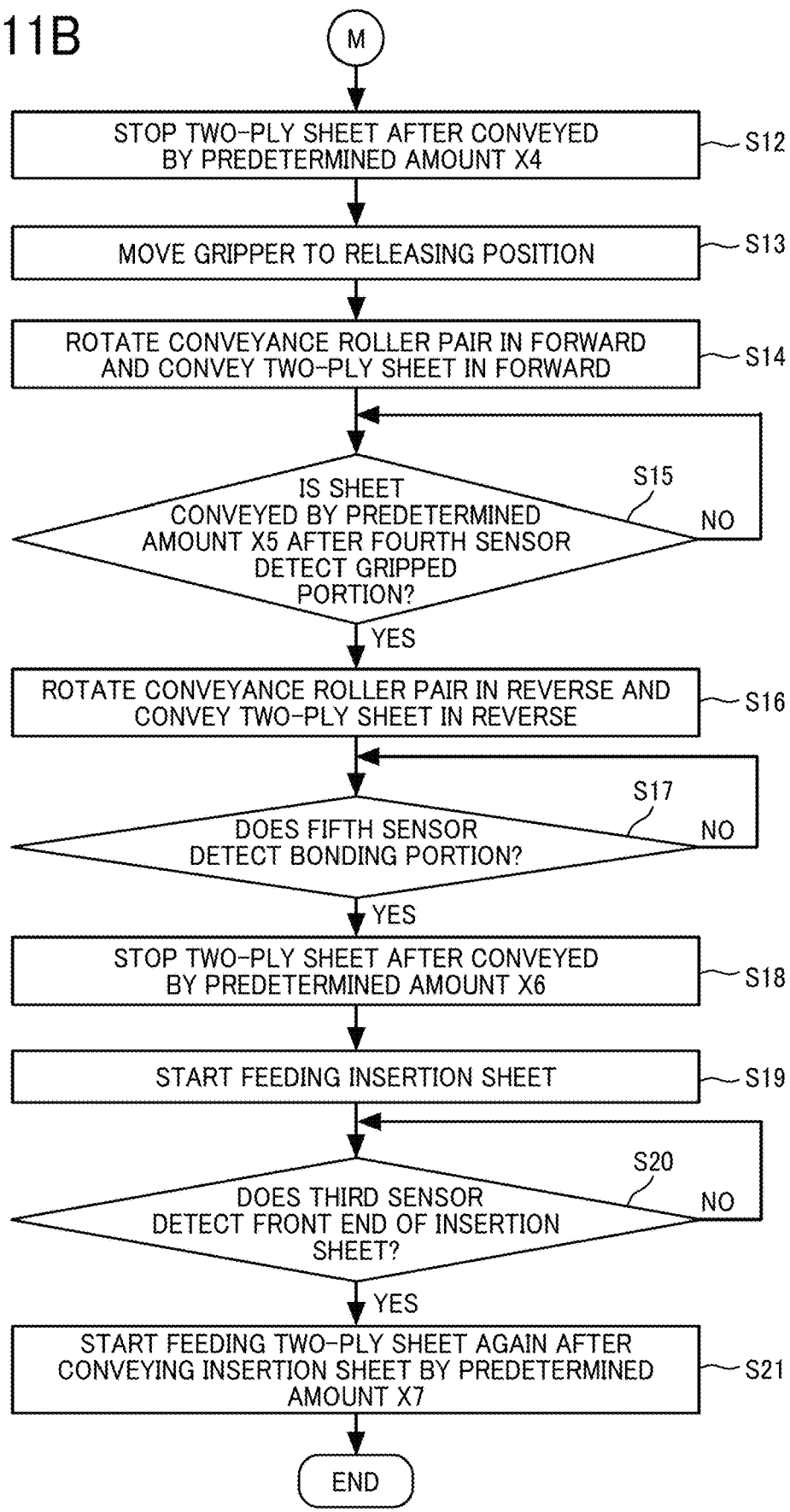

In step S12 of FIG. 11B, as illustrated in FIG. 7A, the controller stops forward rotation in the third conveyance roller pair 6 and forward rotation in the winding roller 20 after the forward rotation in the third conveyance roller pair 6 conveys the two-ply sheet PJ by a predetermined amount of X4. At this time, the gripped portion B of the two-ply sheet PJ is positioned on the third conveyance path K3 (that is, at the winding start position W illustrated in FIG. 5B), and the gripper 32 can release the gripped portion B.

In this state, the gripper 32 moves from the gripping position to the releasing position in step S13 of FIG. 11B. That is, the cam 34 moves to a rotational position at which the cam 34 does not push the arm 31. The gripper 32 releases gripping the two-ply sheet PJ. In the present embodiment, the cam 34 in the moving mechanism 30 moves to release the gripping of the gripper 32, but the third conveyance roller pair 6 may pull the two-ply sheet from the gripper 32 to release the gripping and convey the two-ply sheet without the above-described movement of the cam 34 in the moving mechanism 30 when a pulling force due to the conveyance of the third conveyance roller pair 6 is larger than a force of the gripper 32 that grips the tow-ply sheet PJ.

In step S14 of FIG. 11B, as illustrated in FIG. 7B, the third conveyance roller pair 6 again rotates in forward to start conveyance of the two-ply sheet PJ in the forward direction. At this time, the fourth sensor 44 detects the gripped portion B of the two-ply sheet PJ that is the one end of the two-ply sheet PJ and the back end of the two-ply sheet PJ conveyed in the forward direction. In addition, the gripper 32 moves from the releasing position to the gripping position, and the switching claws 15 rotates clockwise from the standby position to a switching position after the gripped portion B of the two-ply sheet PJ that is the one end of the two-ply sheet PJ and the back end of the two-ply sheet PJ passes over the switching claws 15. When the gripped portion B that is the back end of the two-ply sheet PJ conveyed in the forward direction reaches the vicinity of the separation claws 16 as illustrated in FIG. 7B, back ends of the two sheets P1 and P2 are largely separated and opened (see FIG. 10C).

The controller determines whether the third conveyance roller pair 6 conveys the two-ply sheet PJ by a predetermined amount X5 after the timing, as a trigger, at which the fourth sensor 44 detects the back end of the two-ply sheet PJ conveyed in the forward direction in step S15 of FIG. 11B and stops the conveyance of the two-ply sheet PJ when the third conveyance roller pair 6 conveys the two-ply sheet PJ by the predetermined amount X5. In step S16 of FIG. 11B, the third conveyance roller pair 6 rotates in reverse to start a conveyance of the two-ply sheet PJ in the reverse direction as illustrated in FIG. 7C. At this time, since the switching claws 15 are disposed at the switching positions at which the switching claws 15 block the two-ply sheet PJ moving to the third conveyance path K3, the two sheets P1 and P2 separated each other are guided to the two branched conveyance paths K4 and K5, respectively, as illustrated in FIG. 7C. At this time, the fifth sensor 45 (see FIG. 1) detects the bonding portion A of the two-ply sheet PJ that is the other end of the two-ply sheet PJ and the back end of the two-ply sheet PJ conveyed in the reverse direction.

Subsequently, the controller uses, as a trigger, the timing at which the fifth sensor 45 (see FIG. 1) detects the back end of the two-ply sheet PJ conveyed in the reverse direction that is the bonding portion A in step S17 of FIG. 11B and stops the conveyance of the two-ply sheet PJ at a timing at which the third conveyance roller pair 6 conveys the two-ply sheet PJ by a predetermined amount X6 as illustrated in FIG. 8A in step S18 of FIG. 11B. When the third conveyance roller pair 6 conveys the two-ply sheet PJ by the predetermined amount X6, the bonding portion A of the two-ply sheet PJ is in the nip of the third conveyance roller pair 6 or at a position slightly leftward from the nip. That is, the third conveyance roller pair 6 nips the other end of the two-ply sheet PJ.

Subsequently, as illustrated in FIG. 8A, the second conveyance roller pair 5 starts feeding the insertion sheet PM from the second feed tray 12 (see FIG. 1) in step S19 of FIG. 11B. At this time, the third sensor 43 detects the front end of the insertion sheet PM conveyed in the forward direction that is also referred to as the other end of the insertion sheet PM. In addition, as illustrated in FIG. 8B, the separation claw 16 moves to the standby position.

Subsequently, the controller uses the timing at which the third sensor 43 detects the front end of the insertion sheet PM as a trigger in step S20 of FIG. 11B. After the second conveyance roller pair 5 conveys the insertion sheet PM by a predetermined amount X7 since the third sensor 43 detects the front end of the insertion sheet PM, the third conveyance roller pair 6 again starts the conveyance of the two-ply sheet PJ in the forward direction in step S21 of FIG. 11B as illustrated in FIG. 8C. At this time, the insertion sheet PM is accurately sandwiched at a desired position between the two sheets P1 and P2.

Thus, the controller ends processes to insert the insertion sheet PM between the two sheets P1 and P2 in the two-ply sheet PJ. The third conveyance roller pair 6 conveys the two-ply sheet PJ with the insertion sheet PM inserted therein in the forward direction. The two-ply sheet PJ with the insertion sheet PM is guided to the fourth conveyance path K6 (see FIG. 1) by the bifurcating claw 17 positioned at the reference position (see FIG. 1), passes through the fourth conveyance path K6, and is ejected and placed on the ejection tray 13 (see FIG. 1).

In contrast, when the controller determines that the gap C is not the sufficiently large gap equal to or larger than the predetermined size F as illustrated in FIG. 13A in step S29 of FIG. 11B, that is, when the controller determines that the abnormal state occurs based on results detected by the abnormality detection sensor 46, the controller determines that subsequent separation operations of the separation claws 16 causes various kinds of problems and does not move the separation claws 16 from the standby positions to the separation positions. At this time, the controller controls the operation display panel 49 (see FIG. 1) to notify that the occurrence of the abnormal state stops the separation operations and the insertion operations of the insertion sheet PM in step S30 of FIG. 12.

Figure 12:
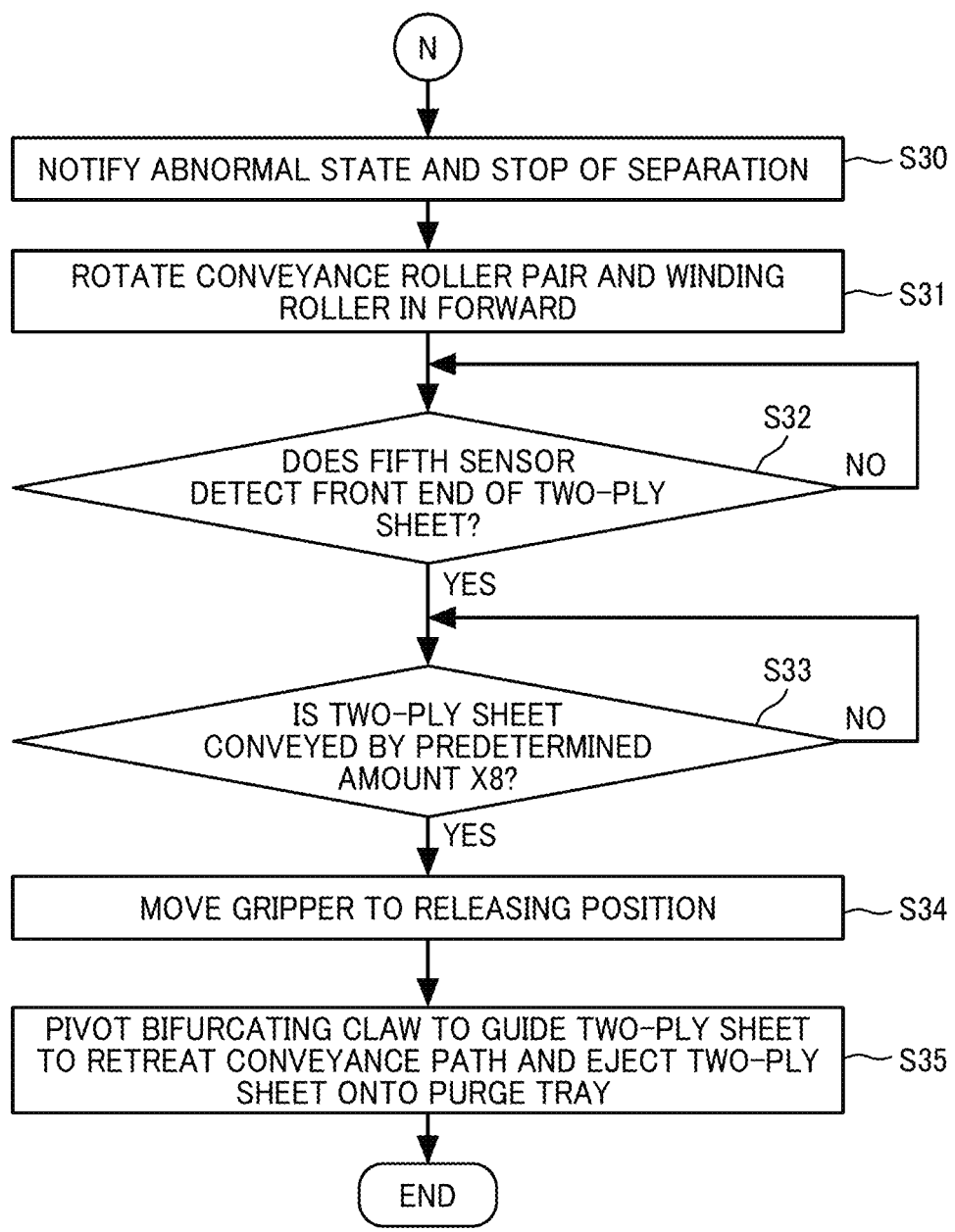
FIG. 12 is a flowchart of a subsequent control process subsequent from the flowchart of FIG. 11, executed when an abnormal state is detected.

In step S31 of FIG. 12, as illustrated in FIG. 13B, the third conveyance roller pair 6 and the winding roller 20 rotate in forward to convey the abnormal two-ply sheet PJ in the forward direction. In step S32 of FIG. 12, the controller determines whether the fifth sensor 45 detects the front end of the two-ply sheet conveyed in the forward direction. The controller uses a timing at which the fifth sensor 45 detects the front end of the two-ply sheet as a trigger to determine whether the two-ply sheet is conveyed by a predetermined amount X8 in step S33 of FIG. 12 and pivot the bifurcating claw 17 counterclockwise in a direction indicated by an arrow in FIG. 13B to the rotational position illustrated in FIG. 13B. After the two-ply sheet is conveyed by a predetermined amount X8, the controller controls the moving mechanism 30 to move the gripper 32 to the releasing position in step S34 of FIG. 12.

As illustrated in FIG. 13B, the bifurcating claw 17 guides the abnormal two-ply sheet PJ to the retreat conveyance path K7. After the two-ply sheet passes through the retreat conveyance path K7, the two-ply sheet PJ is ejected and placed on the purge tray 14 as illustrated in FIG. 13C in step S35 of FIG. 12. After the two-ply sheet is ejected, the bifurcating claw 17 returns to the reference position as illustrated in FIG. 13C. The gripper 32 also returns to the gripping position as illustrated in FIG. 7B.

The controller performs the above-described operations at every time the abnormal state in the two-ply sheet PJ is detected.

Next, a first variation is described.

Figure 14A:
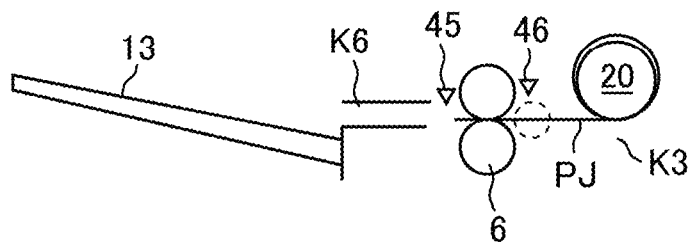
FIGS. 14A and 14B are schematic views of the main part of the sheet separation device illustrated in FIG. 1, illustrating operations of the sheet separation device according to a first variation when the abnormal state is detected.
Figure 14B:
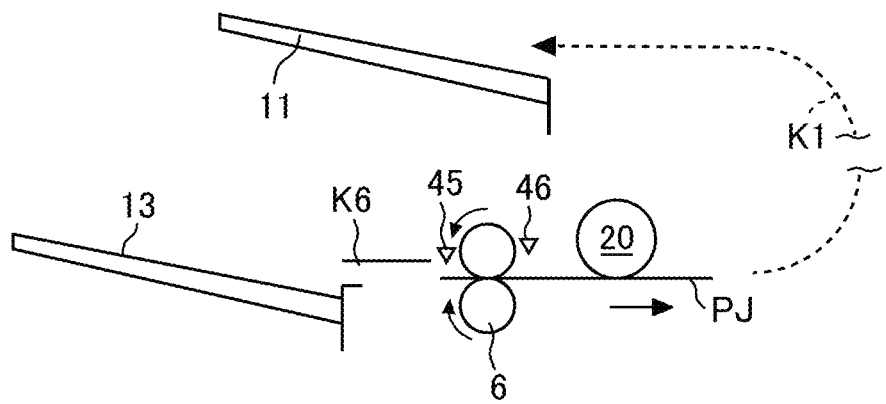

As illustrated in FIGS. 14A and 14B, the controller in the sheet separation device 1 according to the first variation controls the conveyance of the abnormal two-ply sheet PJ so that the abnormal two-ply sheet PJ is conveyed to the first feed tray 11 to place and feed the two-ply sheet in the reverse direction when the controller determines that the abnormal state occurs based on the results detected by the abnormality detection sensor 46 as the abnormality detection device (that is, the two-ply sheet does not have the sufficiently large gap C). That is, the controller controls the conveyance of the abnormal two-ply sheet PJ so that the abnormal two-ply sheet PJ is conveyed to the first feed tray 11 to place and feed the two-ply sheet in the reverse direction in response to the abnormal state detected by the abnormality detection sensor 46.

Specifically, when the controller determines that the gap C is not the sufficiently large gap equal to or larger than the predetermined size F as illustrated in FIG. 14A in step S29 of FIG. 11B, that is, when the controller determines that the abnormal state occurs based on results detected by the abnormality detection sensor 46, the controller determines that subsequent separation operations of the separation claws 16 causes various kinds of problems and does not move the separation claws 16 from the standby positions to the separation positions. At this time, the controller controls the operation display panel 49 (see FIG. 1) to notify that the occurrence of the abnormal state stops the separation operations and the insertion operations of the insertion sheet PM in step S30 of FIG. 12.

Then, the third conveyance roller pair 6 and the winding roller 20 rotates in forward to convey the abnormal two-ply sheet PJ in the forward direction, and the controller determines whether the fifth sensor 45 detects the front end of the abnormal two-ply sheet conveyed in the forward direction. The controller uses a timing at which the fifth sensor 45 detects the front end of the abnormal two-ply sheet as a trigger to determine whether the two-ply sheet is conveyed by a predetermined amount X. After the two-ply sheet is conveyed by a predetermined amount X, the controller controls the moving mechanism 30 to move the gripper 32 to the releasing position. After the gripper 32 releases the abnormal two-ply sheet PJ, as illustrated in FIG. 14B, the first to third conveyance roller pairs 4 to 6 rotate in reverse to convey the abnormal two-ply sheet PJ in the reverse direction. At this time, the gripper 32 has moved to the gripping position at which the gripper 32 does not interfere with the conveyance of the abnormal two-ply sheet PJ.

As illustrated in FIG. 14B, the abnormal two-ply sheet PJ passes through the third conveyance path K3 and the first conveyance path K1 and is ejected and placed on the first feed tray 11.

The above-described control for the abnormal state does not need the retreat conveyance path K7 and the purge tray 14. Therefore, the device can be reduced in size and cost.

Next, a second variation is described.

Figure 15:
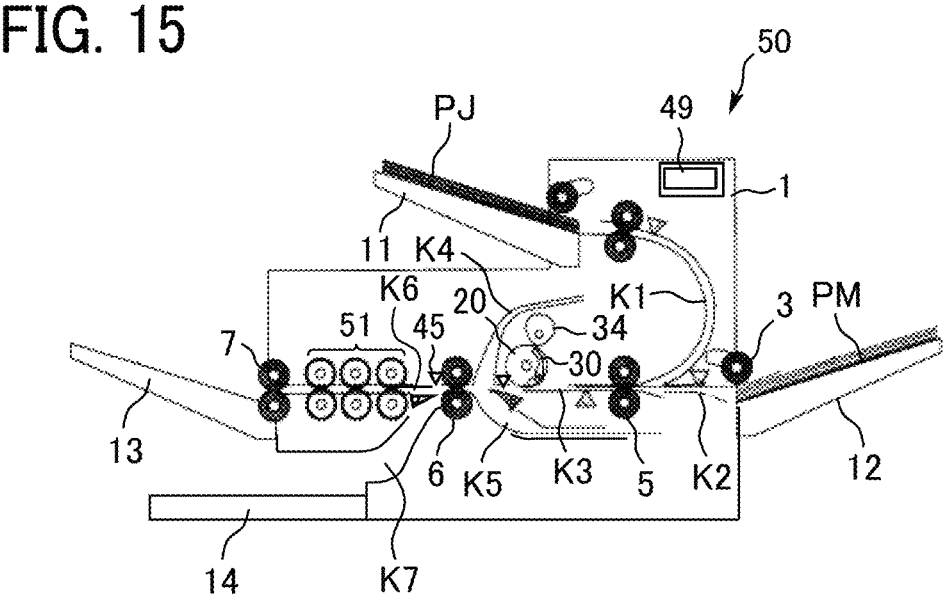
FIG. 15 is a schematic view illustrating a laminator according to a second variation.

As illustrated in FIG. 15, a laminator 50 as the second variation includes the sheet separation device 1 illustrated in FIG. 1.

The laminator 50 includes a lamination processor 51 downstream from the third conveyance roller pair 6 in the sheet separation device 1 in the forward direction. The lamination processor 51 performs a laminating process on the two-ply sheet PJ in which the insertion sheet PM is inserted between the two sheets P1 and P2 separated by the sheet separation device 1 (that is, the normally processed two-ply sheet PJ).

The lamination processor 51 includes a plurality of heat and pressure roller pairs that apply heat and pressure to the two-ply sheet PJ while conveying, in the forward direction, the two-ply sheet PJ into which the insertion sheet PM is inserted. The fourth conveyance path K6 is disposed between the third conveyance roller pair 6 and the lamination processor 51. In addition, the laminator 50 includes the retreat conveyance path K7 branched from the fourth conveyance path K6 and connected to the purge tray 14 and the bifurcating claw 17 at the branched portion.

As described above with reference to FIGS. 4A to 8C, when the abnormal state is not detected by the abnormality detection sensor 46, the normally processed two-ply sheet PJ (into which the insertion sheet PM has been inserted after the separation operations) passes through the fourth conveyance path K6 and is conveyed to the lamination processor 51. The two-ply sheet PJ into which the insertion sheet PM is inserted inside passes through the lamination processor 51, and the entire region of the two-ply sheet PJ is joined. The two-ply sheet PJ subjected to the laminating process described above is ejected to the outside of the lamination processor 51 by an ejection roller pair 7 and is placed on the ejection tray 13.

In contrast, as described above with reference to FIGS. 12 and 13A to 13C, when the abnormal state is detected by the abnormality detection sensor 46, the two-ply sheet PJ that is nor normally processed (that is, the separation operations of the separation claws 16 are not performed, and the insertion sheet PM is not inserted into the two-ply sheet PJ) passes through the retreat conveyance path K7 and is ejected outside the laminator 50 and placed on the purge tray 14.

As described above, the laminator 50 according to the second variation performs a process to feed the sheets PJ and PM, a process to separate the two sheets P1 and P2 in the two-ply sheet PJ, a process to insert the insertion sheet PM into the space between the two separated sheets P1 and P2, and a process to perform the laminating process on the two-ply sheet PJ in which the insertion sheet PM is inserted, as a sequence of processes, thus enhancing the convenience for a user.

In addition, when the two-ply sheet PJ is in the abnormal state, the lamination processor 51 does not perform the laminating process (a thermal fixing process) on the abnormal two-ply sheet PJ and stores the abnormal two-ply sheet PJ on the purge tray 14. Since the lamination processor 51 does not perform the laminating process on the two-ply sheet PJ when the abnormal state is caused by incorrectly setting the two-ply sheet in the first feed tray 11 and solved by correctly setting the two-ply sheet in the first feed tray 11, the laminator 50 can use such a two-ply sheet again. As a result, the two-ply sheet that has caused a process failure is not discarded in vain.

The laminator 50 includes the operation display panel 49. When the controller determines that the abnormal state occurs based on the results detected by the abnormality detection sensor 46, the controller controls the operation display panel 49 to display that the occurrence of the abnormal state stops the separation operations and the insertion operations of the insertion sheet PM.

A third variation is described.

Figure 16:
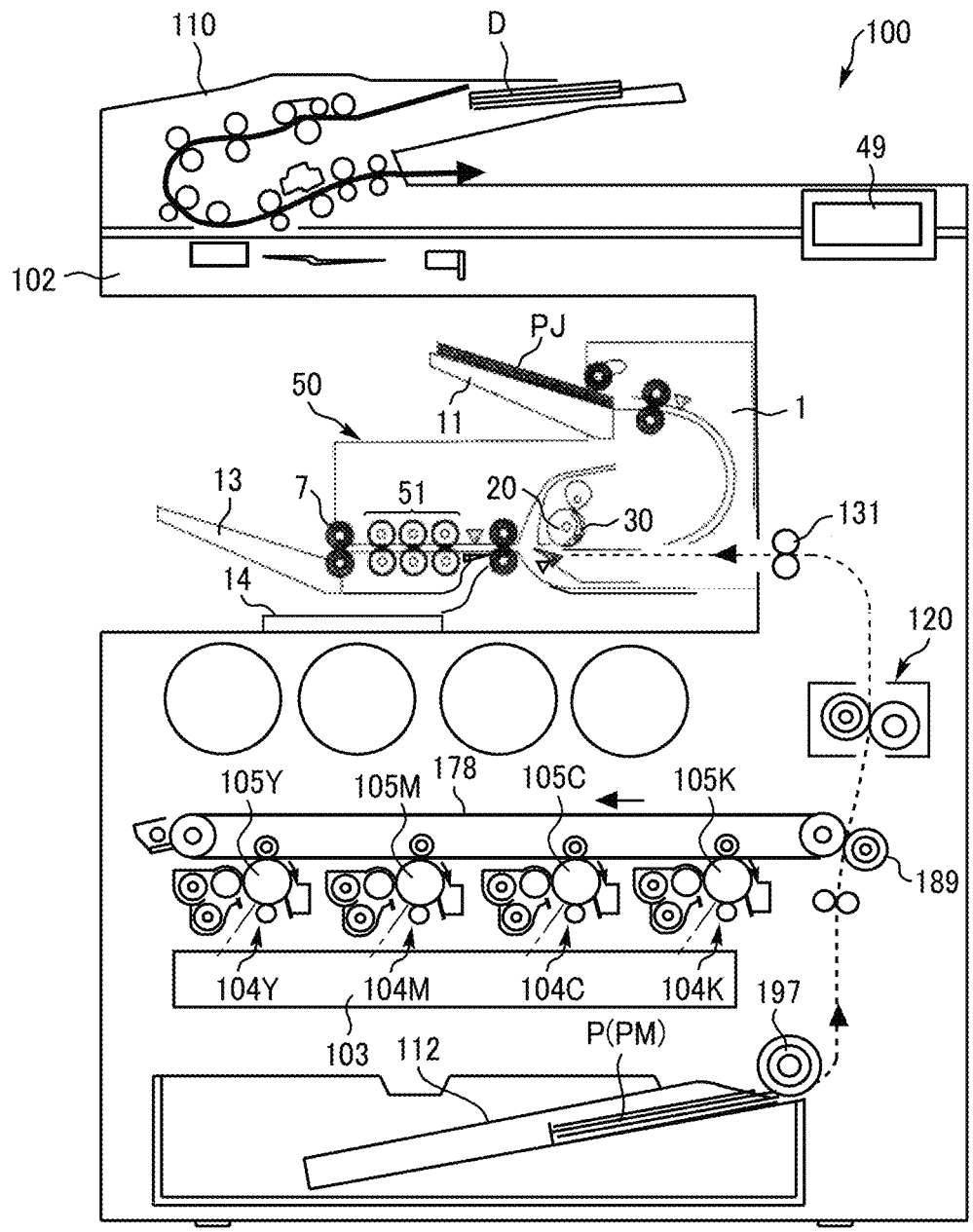
FIG. 16 is a schematic view illustrating an image forming apparatus according to a third variation.

As illustrated in FIG. 16, an image forming apparatus 100 as the third variation includes the laminator 50 illustrated in FIG. 15 and an image forming apparatus main body that forms an image on a sheet P.

With reference to FIG. 16, in the image forming apparatus 100, multiple pairs of sheet conveying rollers disposed in the document conveying unit 110 feeds the original document D from a document loading table and conveys the original document D in a direction indicated by arrow in FIG. 16, and the original document D passes over the document reading device 102. The document reading device 102 optically reads image data of the original document D passing over the document reading device 102.

The image data optically read by the document reading device 102 is converted into electric signals and transmitted to a writing device 103. The writing device 103 emits laser beams onto the photoconductor drums 105Y, 105M, 105C, and 105K based on the electric signals of the image data in each of colors, respectively, performing an exposure process.

On the photoconductor drums 105Y, 105M, 105C, and 105K of the image forming units 104Y, 104M, 104C, and 104K, a charging process, the exposure process, and a developing process are performed to form desired images on the photoconductor drums 105Y, 105M, 105C, and 105K, respectively.

The images formed on the photoconductor drums 105Y, 105M, 105C, and 105K are transferred and superimposed onto the intermediate transfer belt 178 to form a color image. The color image formed on the intermediate transfer belt 178 is transferred to the surface of a sheet P (which is a sheet to be the insertion sheet PM) fed and conveyed by a feed roller 197 from a feeding device 112 at a position at which the intermediate transfer belt 178 faces the secondary transfer roller 189.

After the color image is transferred onto the surface of the sheet P (that is the insertion sheet PM), the sheet P is conveyed to the position of a fixing device 120. The fixing device 120 fixes the transferred color image on the sheet P.

Thereafter, the sheet P is ejected from the image forming apparatus main body of the image forming apparatus 100 by an ejection roller pair 131 and is fed into the laminator 50 as the insertion sheet PM. When the laminator 50 including the sheet separation device 1 receives the insertion sheet PM, the laminator 50 has completed the process described with reference to FIGS. 4A to 7C (that is, the process to separate the two-ply sheet PJ) and performs the process described with reference to FIGS. 8A to 8C (that is, the process to insert the insertion sheet PM into the two-ply sheet PJ) after the laminator 50 (the sheet separation device 1) receives the insertion sheet PM. After the lamination processor 51 performs the laminating process on the two-ply sheet PJ into which the insertion sheet PM is inserted, the ejection roller pair 7 ejects the two-ply sheet PJ to the outside of the lamination processor 51 to place the two-ply sheet PJ on the ejection tray 13.

As described above, a series of image formation processes (i.e. printing operations) in the image forming apparatus 100 and a series of sheet separation processes and the laminating process using the insertion sheet PM on which the image is formed are completed.

In the third variation, the image forming apparatus 100 includes the laminator 50, but may include the sheet separation device 1 illustrated in FIG. 1.

The image forming apparatus 100 includes the operation display panel 49. When the controller determines that the abnormal state occurs based on the results detected by the abnormality detection sensor 46, the controller controls the operation display panel 49 to display that the occurrence of the abnormal state stops the separation operations and the insertion operations of the insertion sheet PM.

The image forming apparatus 100 according to the third variation of the present disclosure is a color image forming apparatus but may be a monochrome image forming apparatus. The image forming apparatus 100 according to the third variation of the present disclosure employs electrophotography, but the present disclosure is not limited to this. The present disclosure may be applied to other types of image forming apparatuses such as an inkjet image forming apparatus and a stencil printing machine.

A fourth variation is described.

Figure 17:
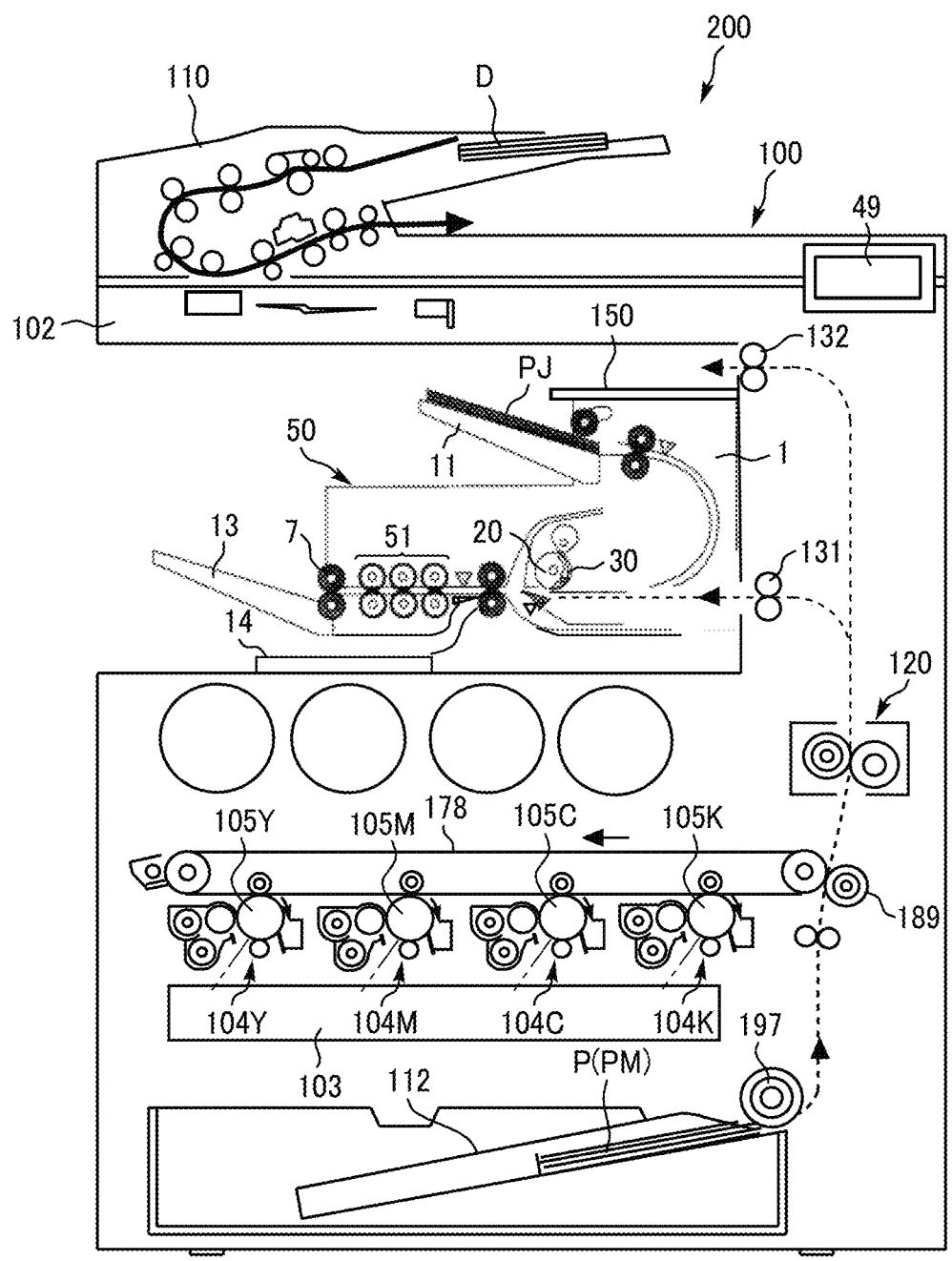
FIG. 17 is a schematic view illustrating an image forming system according to a fourth variation.

As illustrated in FIG. 17, an image forming system 200 according to the fourth variation includes the image forming apparatus 100 illustrated in FIG. 16 that forms the image on the sheet P and the laminator 50 illustrated in FIG. 15, and the laminator 50 is detachably attached to the image forming apparatus 100.

In the image forming system 200 illustrated in FIG. 17, the image forming apparatus 100 performs the image formation described above with reference to FIG. 15 and ejects the sheet P (that is the insertion sheet formed a desired image) from the ejection roller pair 131 to the laminator 50, and the laminator 50 performs the laminating process on the two-ply sheet PJ into which the insertion sheet PM has been inserted, and the ejection roller pair 7 ejects the two-ply sheet PJ to the outside of the laminator 50 to place the two-ply sheet PJ on the ejection tray 13.

When such a laminating process is not performed, the image forming apparatus 100 in the image forming system 200 ejects the sheet P formed the image by the image formation process from a second ejection roller pair 132 to the outside of the image forming apparatus 100 to place the sheet P on a second ejection tray 150.

The laminator 50 is detachably attached to the image forming apparatus 100 and can be detached from the image forming apparatus 100 when the laminator 50 is not necessary. The image forming apparatus 100 from which the laminator 50 is detached uses a placement surface 149 to place the laminator 50 as an ejection tray to place the sheet P formed the desired image by the image formation process and ejected from the ejection roller pair 131 to the outside of the image forming apparatus 100.

In the fourth variation, the image forming system 200 includes the detachable laminator 50. However, the image forming system 200 may include the sheet separation device 1 illustrated in FIG. 1 detachable.

The image forming system 200 includes the operation display panel 49. When the controller determines that the abnormal state occurs based on the results detected by the abnormality detection sensor 46, the controller controls the operation display panel 49 to display that the occurrence of the abnormal state stops the separation operations and the insertion operations of the insertion sheet PM.

As described above, the sheet separation device 1 according to the present embodiment separates the non-bonding portion of the two-ply sheet PJ in which the two sheets P1 and P2 are overlapped and bonded at the bonding portion A and includes the separation claws 16 as the separators that move to be inserted into the gap C formed between the two sheets P1 and P2 of the two-ply sheet PJ at a predetermined positions. In addition, the sheet separation device 1 includes the abnormality detection sensor 46 as the abnormality detection device that detects the abnormal state in which the gap C larger than the predetermined size F is not formed between the two sheets P1 and P2 at a predetermined position before the separation claws are inserted into the gap C. Based on a detection result regarding the abnormal state detected by the abnormality detection sensor 46, the controller controls the movements of the separation claws 16.

The above-described control can prevent the disadvantage that the two-ply sheet PJ is damaged when the two sheets P1 and P2 constituting the two-ply sheet PJ is separated.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. The number, position, and shape of each of the components described above are not limited to the embodiment and variations described above. Desirable number, position, and shape can be determined to perform the present disclosure.

In the present disclosure, the "end surface" of the two-ply sheet is defined as a side surface extending in the thickness direction and connecting the front surface and the back surface of the two-ply sheet. Accordingly, there are four end surfaces of the rectangular two-ply sheet on the front, back, left, and right.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. A sheet separation device configured to separate a non-bonding portion of a two-ply sheet in which two sheets are overlapped and bonded together at a bonding portion of the two-ply sheet, the sheet separation device comprising:
    a separator configured to move to be inserted into a gap formed between the two sheets of the two-ply sheet;
    an abnormality detection device configured to detect an abnormal state in which the gap larger than a predetermined size is not formed between the two sheets before the separator is inserted into the gap; and
    circuitry configured to control movement of the separator based on a result detected by the abnormality detection device.

2. The sheet separation device according to claim 1, further comprising:
    an ejection path configured to eject the two-ply sheet separated after the separator is inserted into the gap; and
    a retreat conveyance path branched from the ejection path, wherein the circuitry is configured to perform control to convey the two-ply sheet in the abnormal state to the retreat conveyance path in response to the abnormal state detected by the abnormality detection device.

3. The sheet separation device according to claim 2, further comprising
    a purge portion configured to store the two-ply sheet conveyed to the retreat conveyance path.

4. The sheet separation device according to claim 1, further comprising
    a feed tray configured to feed the two-ply sheet, wherein the circuitry is configured to perform control to convey the two-ply sheet in the abnormal state to the feed tray in a reverse direction in response to the abnormal state detected by the abnormality detection device.

5. The sheet separation device according to claim 1, wherein the circuitry is configured to perform control to notify occurrence of the abnormal state detected by the abnormality detection device.

6. The sheet separation device according to claim 1, wherein the abnormality detection device is one of a lever type sensor configured to come into contact with the two-ply sheet having the gap larger than the predetermined size, an optical sensor configured to optically detect a distance from the two-ply sheet, and an imaging element configured to image the two-ply sheet.

7. The sheet separation device according to claim 1, further comprising:
    a winding roller configured to rotate and wind the two-ply sheet; and
    a conveyance roller pair configured to convey the two-ply sheet toward the winding roller with one end of the two-ply sheet as a front end in a conveyance path between the winding roller and the conveyance roller pair,
    wherein the circuitry is configured to cause the separator to be inserted in a width direction of the two-ply sheet into the gap formed between the two sheets of the two-ply sheet with the one end being wound around the winding roller and the other end of the two ply-sheet opposite the one end being nipped by the conveyance roller pair, the gap formed between the winding roller and the conveyance roller pair.

8. The sheet separation device according to claim 7, further comprising:
    two branched conveyance paths branched in different directions from the conveyance path between the separator and the winding roller; and
    a divider configured to guide the two sheets separated by the separator to the two branched conveyance paths, respectively.

9. The sheet separation device according to claim 8, further comprising another conveyance roller pair,
    wherein the circuitry is configured to:
        cause the conveyance roller pair to convey the two-ply sheet in a forward direction after the separator is inserted into the gap to release winding the one end of the two-ply sheet around the winding roller;
        cause the conveyance roller pair to convey the two-ply sheet in a reverse direction;

cause the divider to guide the two sheets separated by the separator to the two branched conveyance paths, respectively; and cause said another conveyance roller pair to convey an insertion sheet in the forward direction to insert the insertion sheet between the two sheets separated.

10. The sheet separation device according to claim 7, further comprising:

a receiving portion of the winding roller;

a gripper configured to grip the one end of the two-ply sheet with the receiving portion; and a moving mechanism configured to move the gripper between a gripping position at which the gripper grips the two-ply sheet and a releasing position at which the gripper is released from the gripping position.

11. The sheet separation device according to claim 7, further comprising:

a sensor disposed downstream in a forward direction from the conveyance roller pair and configured to detect the two-ply sheet.

12. The sheet separation device according to claim 1, further comprising:

a winding roller configured to rotate and wind the two-ply sheet; and a conveyance roller pair configured to convey the two-ply sheet toward the winding roller with one end of the two-ply sheet as a front end in a conveyance path between the winding roller and the conveyance roller pair, wherein the two-ply sheet has the bonding portion at the other end opposite the one end.

13. A laminator comprising:

the sheet separation device according to claim 1; and a lamination processor configured to perform a laminating process on the two-ply sheet including an insertion sheet inserted between the two sheets separated by the sheet separation device.

14. An image forming apparatus comprising:

the laminator according to claim 13; and an image forming apparatus main body configured to form an image on a sheet.

15. An image forming system comprising:

an image forming apparatus configured to form an image on a sheet, and the laminator according to claim 13, wherein the laminator is detachably attached to the image forming apparatus.

16. An image forming apparatus comprising:

the sheet separation device according to claim 1; and an image forming apparatus main body configured to form an image on a sheet.

17. An image forming system, comprising:

an image forming apparatus configured to form an image on a sheet, and the sheet separation device according to claim 1, wherein the sheet separation device is detachably attached to the image forming apparatus.

* * * * *